(12) United States Patent
Bompard et al.

(10) Patent No.: US 6,585,842 B1
(45) Date of Patent: Jul. 1, 2003

(54) METHOD AND MACHINE FOR PRODUCING MULTIAXIAL FIBROUS WEBS

(75) Inventors: Bruno Bompard, Lyons (FR); Pierre Olry, Bordeaux (FR); Renaud Duval, Couzon au Mont d'Or (FR); Alain Bruyere, Villefontaine (FR); Dominique Coupe, Le Haillan (FR); Jean Aucagne, La Tour du Pin (FR)

(73) Assignees: Societe Nationale d'Etude et de Construction de Moteurs d'Aviation (SNECMA), Paris (FR); Hexcel Fabrics, Villeurbanne (FR)

( * ) Notice: Subject to any disclaimer, the term of this patent is extended or adjusted under 35 U.S.C. 154(b) by 0 days.

(21) Appl. No.: 09/381,941
(22) PCT Filed: Mar. 25, 1998
(86) PCT No.: PCT/FR98/00597
§ 371 (c)(1),
(2), (4) Date: Sep. 27, 1999
(87) PCT Pub. No.: WO98/44183
PCT Pub. Date: Oct. 8, 1998

(30) Foreign Application Priority Data

Mar. 28, 1997 (FR) .......................................... 97 03832

(51) Int. Cl.⁷ ................................................ B32B 9/00
(52) U.S. Cl. ........................ 156/166; 156/173; 156/175; 156/180; 156/250; 156/273.1
(58) Field of Search .............................. 428/298.7, 408, 428/902; 28/282, 283, 240, 212, 247, 248, 268; 19/65 R; 264/440; 118/308, 312, 36, 630, 634, 712; 156/166, 173, 175, 180, 250, 273.1

(56) References Cited

U.S. PATENT DOCUMENTS

| 3,250,655 A | 5/1966 | Adler |
| 3,566,733 A | 3/1971 | McClean |
| 4,256,522 A | 3/1981 | Britton |
| 5,171,630 A | * 12/1992 | Muzzy et al. |
| 5,688,577 A | 11/1997 | Smith et al. ................. 428/113 |

FOREIGN PATENT DOCUMENTS

| FR | 2 185 497 | 1/1974 |
| GB | 1 447 030 | 8/1976 |

* cited by examiner

Primary Examiner—Richard Weisberger
(74) Attorney, Agent, or Firm—Weingarten, Schurgin, Gagnebin & Lebovici LLP

(57) ABSTRACT

A plurality of unidirectional sheets (30a, 30b, 30c) are superposed in different directions and they are bonded together. At least one of the unidirectional sheets is made by spreading a tow so as to obtain uniform thickness, width not less than 5 cm, and a weight of no more than 300 g/m², cohesion being imparted to the sheet so as to enable it to be handled prior to being superposed with other sheets. Advantageously, the unidirectional sheets are made of carbon fibers and are obtained by spreading out large tows.

48 Claims, 15 Drawing Sheets

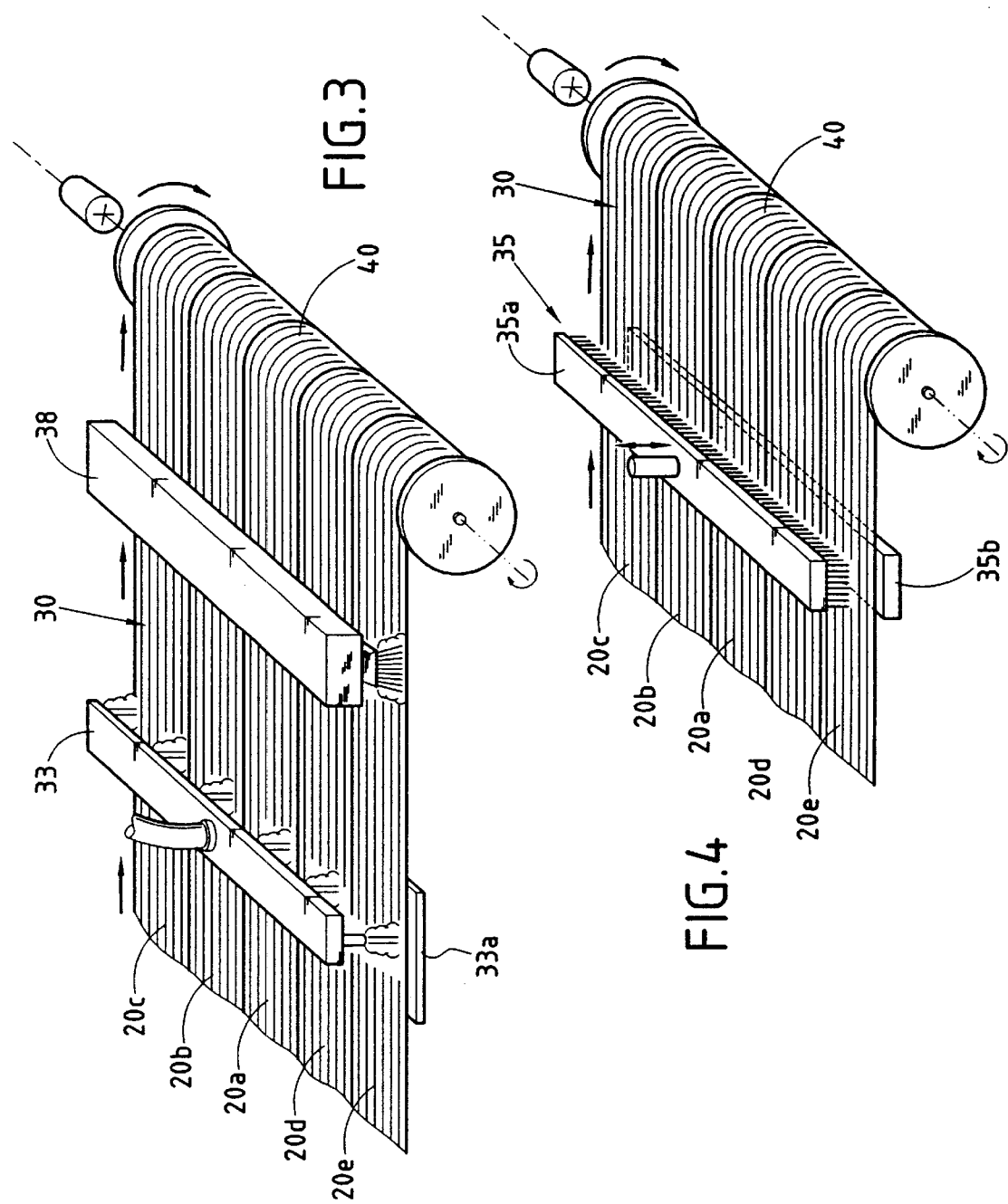

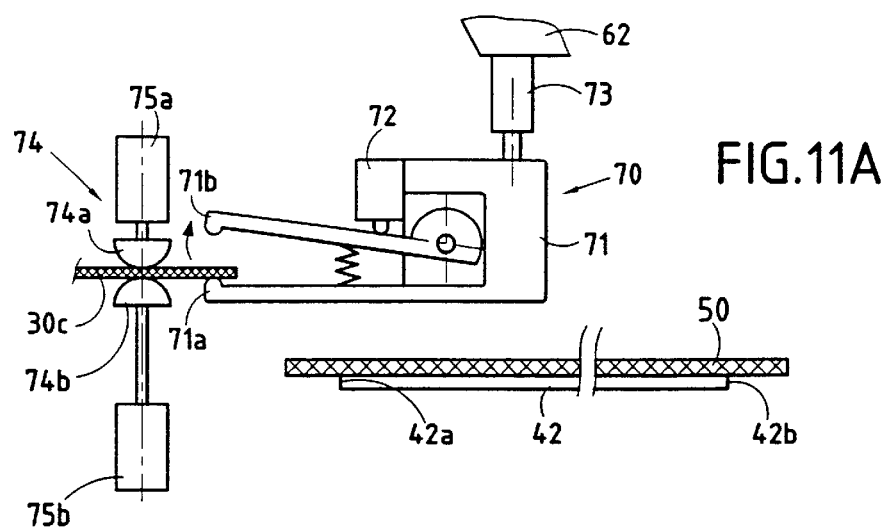
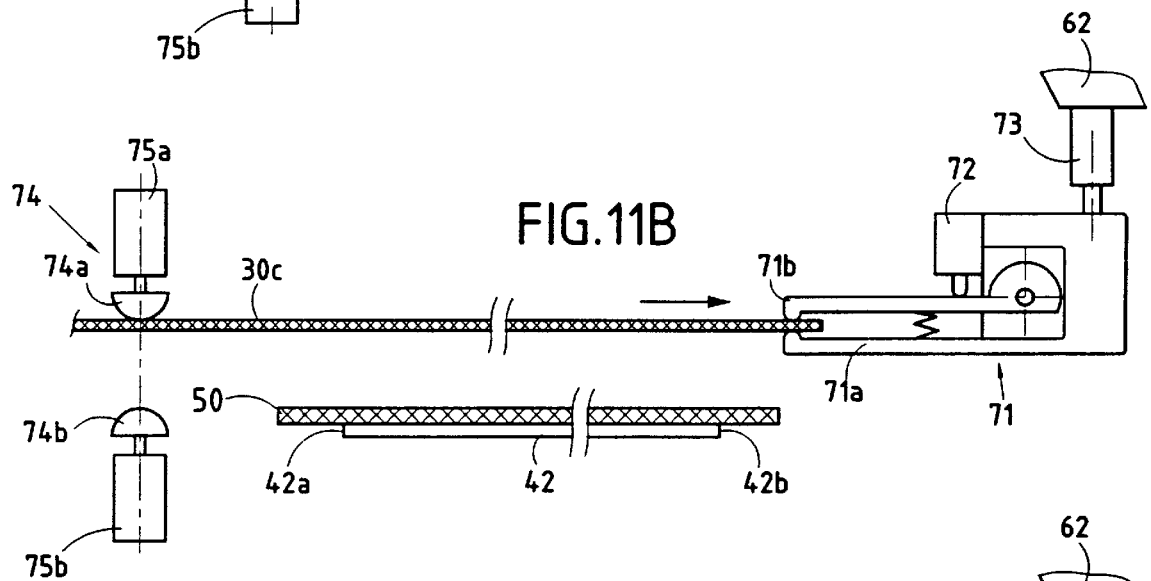
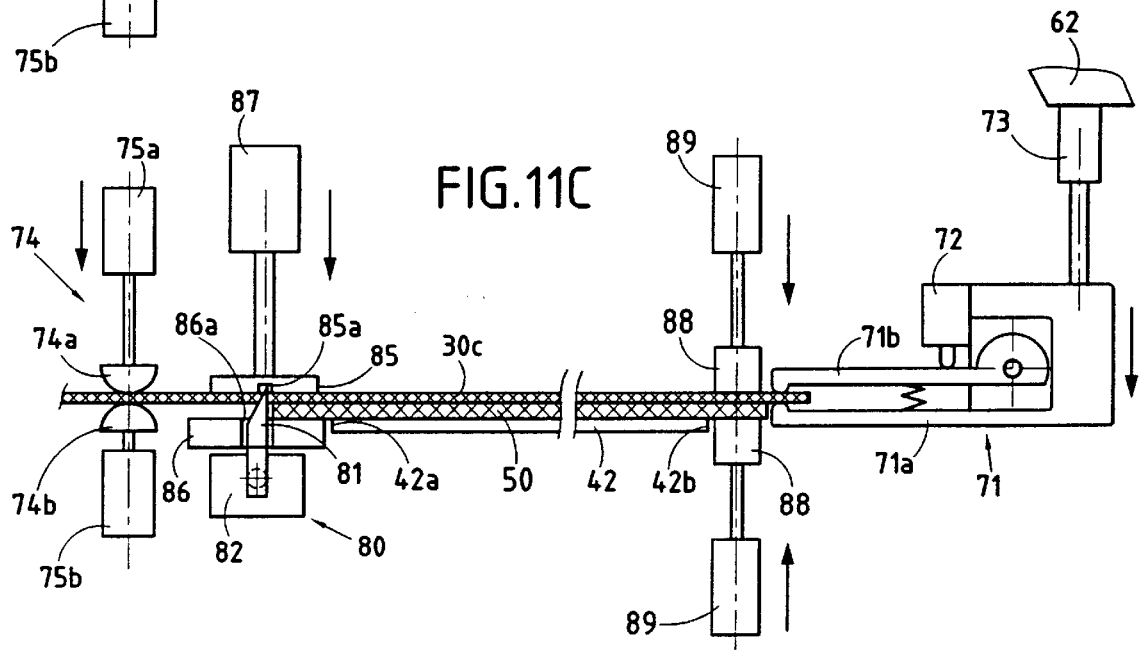

METHOD AND MACHINE FOR PRODUCING MULTIAXIAL FIBROUS WEBS

FIELD OF THE INVENTION

The invention relates to making fiber sheets, and more particularly multiaxial sheets formed by superposing and linking together a plurality of unidirectional fiber sheets disposed in different directions.

A field of application of the invention lies in making multiaxial fiber sheets for forming reinforcing plies for preparing composite material parts. The intended materials are particularly those constituted by fiber reinforcement which can be organic or inorganic, or precursors therefor such as fibers of polymer, glass, carbon, ceramic, para-aramid, . . . , which reinforcement is densified by an organic matrix, e.g. a resin, or an inorganic matrix, e.g. glass, carbon, or ceramic.

STATE OF THE ART

It has been known for a long time to make multiaxial fiber sheets by superposing unidirectional sheets, i.e. made up of threads or fibers that are oriented essentially in a single direction, the unidirectional sheets being superposed in different directions.

A common technique consists initially in making the unidirectional fiber sheets, and in giving them sufficient cohesion to enable them to be handled without dispersing the elements making them up.

A commonly proposed solution consists in bonding together the elements forming the warp of the unidirectional sheets by threads extending in the weft direction. This inevitably results in undulations being formed which, when a plurality of sheets are superposed and pressed against one another, can cause fibers to be crushed and broken, thereby creating discontinuities. That degrades the multiaxial sheets made in that way and consequently degrades the mechanical properties of the composite material parts prepared from such multiaxial sheets.

To remedy that drawback, a well-known solution consists in using bonding threads of number and weight that are as small as possible. Document GB-A-1 190 214 (Rolls Royce Limited) concerning sheets of carbon precursor fibers, and document FR-A-1 469 065 (Les Fils d'Auguste Chomarat & Cie), concerning sheets of glass fibers, illustrate that approach. Nevertheless, it is clear that the above-mentioned drawback is diminished but not eliminated.

It is also proposed in document EP-A-0 193 478 (Etablissements Les Fils d'Auguste Chomarat & Cie) to use bonding fibers but made of a heat-fusible material. During the preparation of the composite material, the temperatures used can cause the bonding threads to melt at least in part, thereby reducing the extra thickness where they cross the warp elements. However it is necessary for the material of the bonding fibers to be compatible with the nature of the matrix of the composite material, which greatly limits the use of that method.

Another solution mentioned in document FR-A-1 394 271 (Les Fils d'Auguste Chomarat & Cie) consists in placing glass fiber threads parallel to one another and in bonding them together chemically, the binder used being soluble in the matrix. In that case also, the need for compatibility between the binder and the matrix limits applications of the method. Furthermore, no means is described to enable the threads to be placed parallel to one another, and it will readily be understood that making wide sheets on an industrial scale gives rise to real practical difficulties. Finally, the resulting sheet is not free from undulations resulting from the threads being placed side by side.

Yet another solution consists in spreading out a plurality of tow, bringing together the resulting unidirectional fiber strips in a side by side configuration to form a sheet, and in imparting transverse cohesion to the sheet by needling. Such a method is described in particular in document U.S. Pat. No. 5,184,387 (assigned to Aerospace Preforms Limited) where the tows used are made of carbon precursor fibers capable of being needled without being broken. Nevertheless, multiaxial sheets are not made by superposing those unidirectional sheets. According to that document, annular sectors are cut out from the unidirectional sheet to form annular plies which are superposed and needled.

To avoid the need to give even temporary cohesion to unidirectional sheets for making multiaxial sheets, it is known to make the multiaxial sheets directly by forming a plurality of unidirectional sheets and by superposing them in different directions without any intermediate handling. The superposed sheets can be connected to one another by bonding, by sewing, or by knitting.

Documents illustrating that technique are, for example, documents: U.S. Pat. Nos. 4,518,640, 4,484,459, and 4,677,831.

In document U.S. Pat. No. 4,518,640 (assigned to Karl Mayer) reinforcing threads are introduced into the sheet while it is being formed, thereby making it possible to provide bonding without piercing through the fibers. Nevertheless, that gives rise to openings being present in the multiaxial sheet, which openings produce surface discontinuities.

In document U.S. Pat. No. 4,484,459 (assigned to Kyntex Preform), each unidirectional sheet is formed by causing a thread to pass around spikes carried by two parallel endless chains, such that the portions of the threads that extend freely between the spikes are mutually parallel. Unidirectional sheets are formed by guiding the respective threads in different directions, and they are bonded to one another by sewing. With that technique it is not possible to have reinforcing threads in the longitudinal direction of the multiaxial sheet; unfortunately, it is often necessary to place reinforcing elements in that main direction. In addition, if a large amount of tension is exerted on the threads to guarantee parallelism in each sheet, then the portions of the threads extending between the spiked chains can tend to become rounded by the fibers tightening, thereby giving rise to openings in the multiaxial sheet. Finally, it will be observed that that technique does not make a very high production speed possible given the time required for forming each unidirectional sheet.

In document U.S. Pat. No. 4,677,831 (assigned to Liba Maschinenfabrik GmbH), the technique described consists in displacing a main unidirectional sheet longitudinally parallel to the direction of the elements which make it up, and in laying transverse unidirectional sheets thereon in directions that make predetermined angles with the direction of the main sheet (0°), for example +45° and −45° and/or +60° and −60°. The transverse sheets are laid by a laying process between two spiked chains situated on either side of the main sheet. That technique which does not necessarily require a main sheet to be present, also suffers from several drawbacks.

Thus, it is necessary to eliminate the marginal zones where the transverse sheets turn around the spikes.

Unfortunately, the wider the transverse sheets, the larger the marginal zones, and the larger the losses of material due to their being eliminated, and it is also more difficult to turn the sheets on the spikes. This greatly limits the width that can be used for the transverse sheets. In addition, the above-mentioned drawback of possible irregularity in the multiaxial sheet is also to be found, in particular due to the formation of holes because of the tensions that it is necessary to apply to the elements of the transverse sheets in order to hold them parallel during laying.

In addition, relatively high stitch density is necessary immediately after laying in order to confer sufficient strength to the resulting multiaxial sheet. In addition to making it impossible to preserve a smooth surface state, this high stitch density affects the flexibility of the multiaxial sheet and limits its deformability in use, e.g. by draping.

Furthermore, when a main sheet (0°) is provided, it is necessary to support it while the transverse sheets are being laid, such that all of them are to be found on the same side of the main sheet. Reinforcing elements are indeed provided that extend in the main direction (0°), but the resulting multiaxial sheet is not symmetrical between its faces. Unfortunately, such symmetry is advantageous to facilitate the construction of regular reinforcement and it is therefore desirable to place the main direction at 0° in the middle of the multiaxial sheet, between its faces.

It should also be observed that a drawback common to those techniques using threads for forming unidirectional sheets lies in obtaining multiaxial sheets which firstly present surface roughness due to the threads, and secondly cannot be as thin as it is sometimes desired.

Finally, a method of making a multiaxial sheet from unidirectional sheets is also described in document GB-A-1 447 030 (Hyfil Limited). A first unidirectional sheet of warp-forming carbon fibers is pre-needled and another, weft-forming unidirectional sheet is bonded to the first, likewise by needling. The pre-needling of the first sheet seeks to displace fibers from the side where the second sheet is to be placed, in order to contribute to bonding therewith. It will be observed that the unidirectional sheets used are made coherent by a bonding thread, as described in above-mentioned document GB-A-1 190 214, with the drawbacks that result therefrom.

It should also be observed that the above-mentioned known techniques all suffer from a drawback which lies in the relatively high cost of multiaxial fiber sheets when they are made using carbon fibers. There exists a need to reduce the cost of such sheets, in particular so as to extend their field of application.

OBJECTS OF THE INVENTION

An object of the invention is to propose a novel method of making multiaxial fiber sheets, in particular to enable the cost of making such sheets to be reduced, so as to cause multiaxial sheets made with fibers that have the reputation of being expensive, such as carbon fibers, to be more attractive.

Another object of the invention is to propose a method enabling "mirror" multiaxial sheets to be made, i.e. multiaxial sheets presenting symmetry relative to a midplane, in particular relative to a main unidirectional sheet (0°), which sheet is therefore situated between transverse unidirectional sheets making opposite angles relative to the main direction.

Another object of the invention is to propose a method enabling multiaxial fiber sheets to be made that present a surface of smooth appearance without irregularities such as holes or roughnesses.

Another object of the invention is to propose a method enabling multiaxial fiber sheets to be made requiring only a very low density of bonding transversely to the unidirectional sheets making them up in order to ensure coherence, thereby enabling good deformability of the multiaxial sheets to be preserved.

Another object of the invention is to provide multiaxial fiber sheets having the above properties while also being of great length, and of small thickness and weight (per unit area).

Another object of the invention is to propose a laying method and machine enabling multiaxial fiber sheets to be made from unidirectional sheets that can be relatively wide, while conserving good surface regularity and limiting losses of material.

BRIEF SUMMARY OF THE INVENTION

In one aspect, the invention provides a method of making a multiaxial fiber sheet, the method comprising the steps consisting in superposing a plurality of unidirectional sheets in different directions, and in bonding the superposed sheets together, in which method, to make at least one unidirectional sheet, at least one tow is spread so as to obtain a sheet of substantially uniform thickness, having a width of not less than 5 cm and a weight of not more than 300 grams per square meter ($g/m^2$), and cohesion is imparted to the unidirectional sheet enabling it to be handled prior to being superposed with at least one other unidirectional sheet.

In a feature of the method, to make at least one of the unidirectional sheets, a plurality of tows are used, the tows are spread so as to form unidirectional strips, and the strips are placed side by side so as to obtain a unidirectional sheet having a width of not less than 5 cm and weighing not more than 300 $g/m^2$.

To further improve an advantage of the method, in particular when using carbon, at least one of the unidirectional sheets is preferably obtained by spreading at least one tow having a number of filaments equal to or greater than 12 K (12,000 filaments) and possibly as many as 480 K (480,000 filaments) or more.

A similar technique can be used with all technical fibers.

An advantage of the method is thus to use large tows, in particular the largest tows available for various kinds of fiber.

For given weight, particularly with carbon, the cost of a fat tow is much less than that of a thin tow or thread of the kind which, so far as the Applicants are aware, are those used in the state of the art for making multiaxial sheets.

By way of illustration, the following table applies to commercially available carbon threads or tows formed using different numbers of filaments, and gives the weights that can be obtained for a unidirectional sheet, depending on whether it is formed by mutually parallel threads as in the prior art, or by spreading tows as in the present invention. The threads or tows are made of high strength or high modulus carbon with a polyacrylonitrile or an anisotropic pitch precursor.

| | Weight | |
|---|---|---|
| Thread or tow Number of filaments | Unidirectional sheet made up of parallel threads | Unidirectional sheet made by spreading and fixing |
| 3K | 150 to 200 g/m² | |
| 6K | 200 to 250 g/m² | |
| 12K | 250 to 300 g/m² | 100 to 150 g/m² |
| 50K | | 100 to 250 g/m² |
| 320K | | 100 to 300 g/m² |
| 480K | | 200 to 300 g/m² |

A tow is spread or a plurality of tows are spread and juxtaposed, so as to form at least one unidirectional sheet having weight per unit area no greater than 300 grams per square meter (g/m²), thus making it possible from a limited number of heavy tows to provide a sheet of relatively broad width, i.e. at least 5 cm, and preferably at least 10 cm.

The use of unidirectional sheets of relatively light weight makes it possible to conserve this property in multiaxial sheets made up of such unidirectional sheets.

In addition, contrary to the above-mentioned prior art techniques using sheets of parallel threads, spreading tows until lightweight sheets are obtained causes multiaxial sheets to be made that do not have surface defects such as holes or undulations, and that have smooth surface appearance. It is also possible with the method of the invention to use fibers that are fragile.

When the unidirectional sheet is built up from discontinuous filaments, cohesion can be imparted thereto by matting the filaments to a small extent. To this end, the sheet can be subjected to needling or it can be exposed to a jet of water under pressure, the sheet being disposed over a plate. The sheet can then be widened without losing its cohesion.

In all cases, regardless of whether the unidirectional sheet is made of filaments that are continuous or discontinuous, cohesion can be imparted thereto by providing a chemical bonding agent which may optionally be suitable for being eliminated (or sacrificed). The agent is advantageously applied by spraying a liquid compound onto the sheet or by passing it through a bath. Cohesion can also be provided by dusting a heat-fusible or thermo-adhesive polymer in powder form onto the sheet.

It is also possible to envisage imparting transverse cohesion to at least one of the unidirectional sheets used by fixing by means of at least one heat-fusible or thermo-adhesive film or thread, or indeed by forming a line of adhesive, e.g. an adhesive in solution in an evaporatable solvent.

The method of the invention seeks more particularly to make a continuous multiaxial sheet having a longitudinal direction, by fetching at least one transverse unidirectional sheet onto a moving support that moves in a direction of advance parallel to the longitudinal direction of the multiaxial sheet, the or each transverse unidirectional sheet being fetched as successive segments that are adjacent or that overlap in part and that form the same selected angle relative to the direction of advance.

The cohesion of the superposed unidirectional sheets makes it possible to make multiaxial sheets without constraints on laying the unidirectional sheets relative to one another, thus providing great flexibility concerning the order in which the unidirectional sheets are superposed. It is thus possible to make multiaxial sheets that present symmetry relative to a midplane ("mirror" symmetry), in particular relative to a longitudinal middle unidirectional sheet whose direction is parallel to the direction of advance, together with at least two transverse unidirectional sheets disposed on either side of the longitudinal sheet and forming opposite angles relative thereto.

In a preferred implementation of the method, each of the successive segments forming a transverse sheet is fetched by moving the sheet over a length substantially equal to the dimension of the multiaxial sheet as measured parallel to the direction of the transverse sheet, by cutting off the segment fetched in this way, and by depositing the cutoff segment on the moving support or the multiaxial sheet that is being made. Advantageously, the transverse sheet is reinforced in the zones where it is cut, e.g. by fixing a film on at least one of its faces.

It will be observed that laying transverse sheets in successive cutout segments makes it possible to limit losses of material compared with the known technique of laying by turning the sheet around spikes. In addition, working in this way avoids damaging the fibers, and therefore makes it possible to lay fibers that are fragile, such as high modulus carbon fibers or carbon fibers based on anisotropic pitch, or ceramic fibers. In addition, restarting the laying process after a break in transverse sheet feed is made much easier compared with the case where the transverse sheets are formed by a set of parallel fibers that are not bonded together.

In another aspect, the invention provides a unidirectional or multiaxial fiber sheet as obtained by the above method.

In yet another aspect, the invention provides making composite material parts that comprise fiber reinforcement densified by a matrix, in which parts the fiber reinforcement is made from at least one such unidirectional or multiaxial sheet.

In a further aspect, the invention provides a laying machine enabling the preferred implementation of the method to be performed.

To this end, the invention provides a laying machine for making a multiaxial fiber sheet by superposing unidirectional fiber sheets in different directions, the machine comprising:

apparatus for advancing the multiaxial sheet, the apparatus comprising support means for supporting the multiaxial sheet that is being made and drive means for driving the support means in a direction of advance;

feed means for feeding longitudinal unidirectional sheet in a direction parallel to the direction of advance;

a plurality of cross-laying devices each including feed means for feeding the cross-laying device with continuous unidirectional sheet, a moving grasping head for taking hold of the free end of a sheet, and means for laying successive segments of sheet parallel to a transverse direction at a selected angle relative to the direction of advance, said laying means comprising means for driving the grasping head; and bonding means for bonding the superposed unidirectional sheets together, the bonding means being located downstream from the support means in the direction of advance, in which machine:

each cross-laying device includes cutter means; and
means are provided for performing successive cycles comprising, for each cross-laying device, grasping the free end of a unidirectional sheet by means of the grasping head, moving the grasping head to fetch a segment of unidirectional sheet, cutting off the fetched segment of unidirectional sheet, and laying the cutoff segment of unidirectional sheet on the support means.

An Important advantage of such a machine lies in the possibility of laying unidirectional sheets of relatively broad width, including in the transverse directions.

Superposed unidirectional sheets can be bonded together in various ways, e.g. by sewing, by knitting, by needling, or by adhesive, e.g. by spraying an adhesive agent or by inserting a heat-fusible or thermo-adhesive film or thread between the sheets. A bonding agent that may possibly have been used for providing cohesion within unidirectional sheets can be reactivated to bond the sheets to one another.

BRIEF DESCRIPTION OF THE DRAWINGS

The invention will be better understood on reading the following description given by way of non-limiting indication with reference to the accompanying drawings, in which:

FIG. 3 is a fragmentary view of a first variant embodiment of the cohesion means of the FIG. 1 installation;

FIG. 4 is a fragmentary view of a second variant embodiment of the cohesion means of the FIG. 1 installation;

FIGS. 11A to 11C show the successive steps of fetching, cutting, and fixing a segment of transverse unidirectional sheet in the machine of FIGS. 6A–6B;

DETAILED DESCRIPTION OF PREFERRED EMBODIMENTS

Making a Unidirectional Sheet (FIGS. 1 to 5)

Tows are spread individually and the resulting unidirectional strips are optionally juxtaposed to form a unidirectional sheet whose cohesion is provided by supplying a bonding or attaching agent between the filaments making up the sheet, prior to storing the sheet on a reel.

Figure 1:
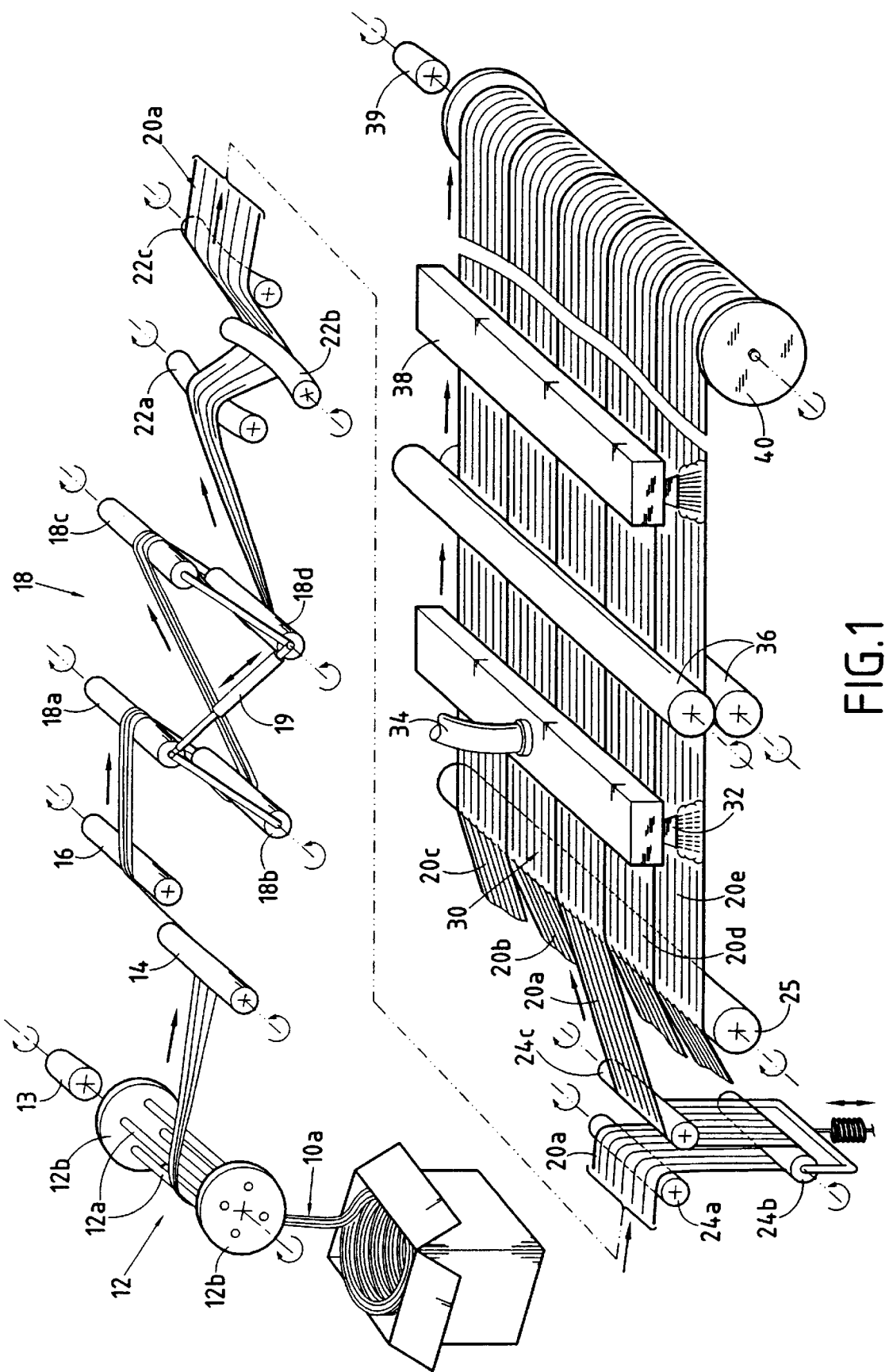
FIG. 1 is a fragmentary overall view of an installation enabling coherent unidirectional sheets to be made.

In FIG. 1, a single tow spreading device is shown so as to clarify the drawing. A tow 10a is taken directly from a box in which it was stowed. In a variant, the tow can be taken from a reel carried by a creel.

Tows of various kinds can be used depending on the use intended for the sheet. For example, the tows may be of carbon fibers or ceramic fibers, or of fibers that are precursors of carbon or ceramic, glass fibers, aramid fibers, or a mixture of different kinds of fiber. Suitable ceramics are in particular silicon carbide and refractory oxides, e.g. alumina and zirconia. The tows can be made of continuous filaments or of discontinuous filaments, and if they are discontinuous they can be obtained, for example, by bursting tows of continuous filaments. With tows made of discontinuous filaments, it is possible to use hybrid tows comprising filaments of different materials that are intimately mixed together. That can be achieved by fetching burst tows or ribbons made of different materials and mixing the fibers thereof by passing them through a gill box.

When possible, heavy tows are used, specifically for the purpose of reducing the cost price of the resulting sheets. The term "heavy" tow is used herein for a tow made up of at least 12 K filaments (i.e. a tow made up of 12,000 filaments), preferably a tow having a number of filaments not less than 50 K, and possibly as many as 480 K or even more.

The tow 10a passes over a picker and disentangler device 12 formed by a plurality of bars 12a extending between two end plates 12b, the entire assembly being rotated about an axis parallel to the bars under drive from a motor 13. The bars 12a, e.g. four bars, are disposed regularly around the axis of rotation.

After passing over two deflector rolls 14 and 16 mounted to rotate freely, the tow 10a reaches a tension-adjustment device 18 made up of four rolls 18a, 18b, 18c, and 18d that are likewise mounted to rotate freely. These rolls constitute, in well-known manner, a parallelogram that is deformable under drive from an actuator 19 which makes it possible by acting on arms carrying the rolls to lengthen or shorten the path of the tow 10a through the tension-adjusting device so as to keep the tension constant.

Thereafter, the tow 10a passes successively over a plurality of fixed curved rolls 22a, 22b, 22c that are "banana" shaped. These rolls, of which there may be three for example, operate in known manner to spread out the ribbon so as to form a thin unidirectional strip 20a.

The tension in the strip 20a is measured in conventional manner by passing over rolls 24a, 24b, and 24c, in which the roll 24b is movable vertically while being biased by an elastic force. Information about variation in the tension of the strip as supplied by measuring the displacement of the axis of the roll 24b is used to control the actuator 19 so as to keep the measured tension constant.

The strip 20a is placed adjacent to other strips 20b, 20c, 20d, and 20e that are identical or similar on a roll 25 that is free to rotate, thereby forming a unidirectional sheet 30. The strips can thus come from tows that are identical or different, e.g. if different, from tows of different weights, or made of fibers of different kinds, thereby making it possible to obtain a hybrid sheet.

The strips 20b to 20e are obtained by means of tow-spreading devices identical to the device described above.

Figure 2:
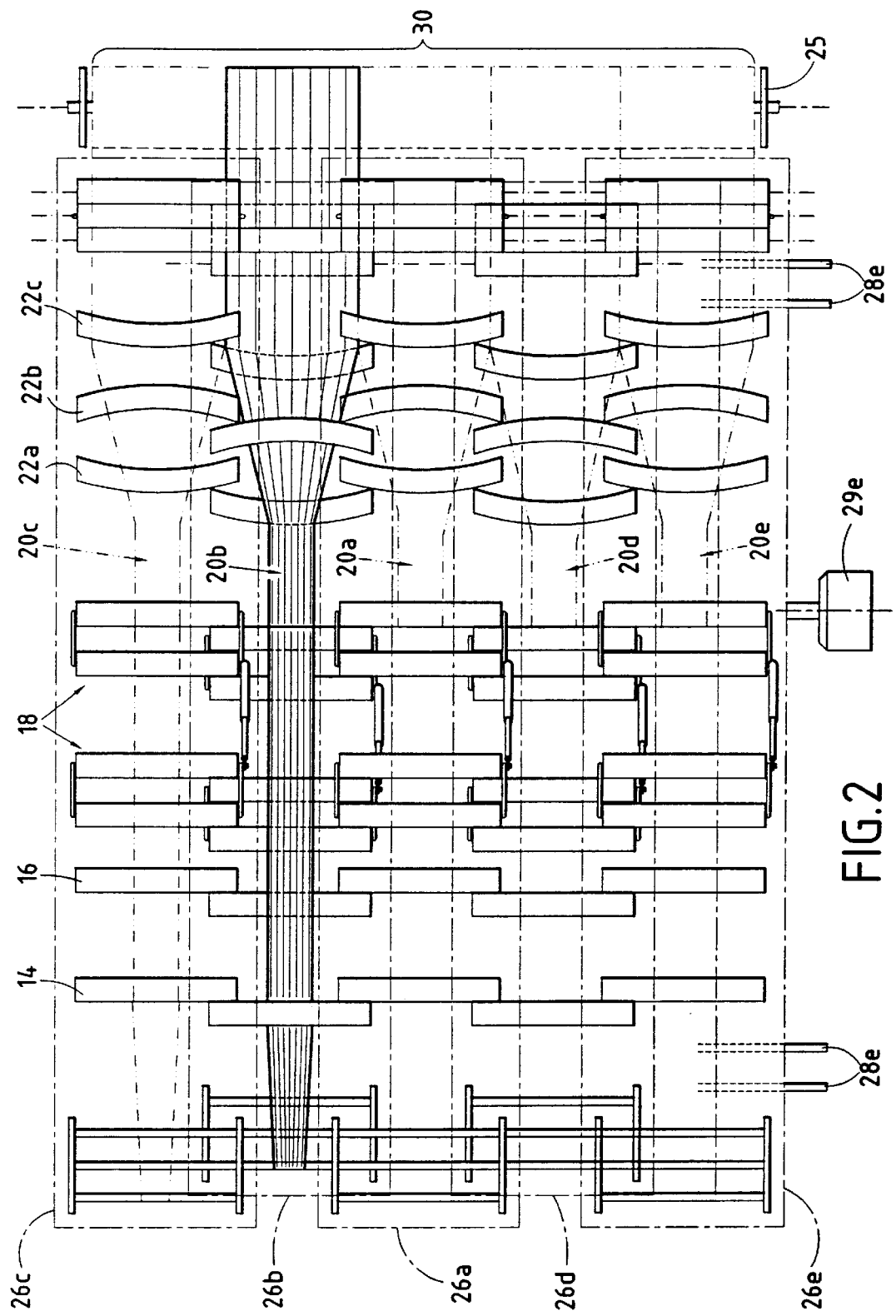
FIG. 2 is a fragmentary diagrammatic plan view of the FIG. 1 installation.

As shown in FIG. 2, the various spreader devices are mounted on respective frames 26a, 26b, 26c, 26d, and 26e represented by chain-dotted rectangles. The frames are located alternately above and below a common horizontal plane so as to avoid interfering with one another.

The strips 20a to 20e coming from different spreader devices meet on the roll 25. In order to adjust the positions of the strips so that they are exactly adjacent, the transverse positions of the frames relative to the advance direction of the tows, can be adjusted. Thus, each frame, e.g. 26e, can be moved along transverse guiding slideways 28e under drive from a motor 29e.

In a variant, the unidirectional strips can be placed one beside another in a manner that is not adjacent, but that includes partial overlap. Smaller tolerance is required compared with placing the strips exactly edge to edge, however the portions situated along each edge in the resulting sheet will need to be sacrificed.

Transverse cohesion can be imparted to the sheet 30 by projecting a liquid compound thereon downstream from the roll 25, said compound containing a chemical bonding agent, e.g. a compound comprising a polymer in solution.

Various polymers can be used. Advantageously, the polymers used can be suitable for being sacrificed, i.e. they should be easy to eliminate, e.g. by being dissolved or by applying heat treatment. Amongst such polymers, mention can be made of polyvinyl alcohol (PVA) or polyvinylpyrrolydone type polymers that are soluble in water, and of soluble polyester. It is also possible to envisage using polymers that are compatible with a matrix that is deposited at a later stage when making a composite material using a reinforcing fabric made from a multiaxial sheet including the unidirectional sheet. The term "polymer compatible with the matrix" is used herein to designate a polymer, e.g. a resin, having the same kind as or suitable for dissolving in the matrix, or indeed a polymer that is of a different kind but whose presence in contact with the matrix does not affect the properties of the composite material.

The liquid compound is delivered to nozzles 32 via a feed pipe 34. After the compound has been sprayed, the sheet passes between two rolls 36 which are pressed against each other at adjusted pressure so as to distribute the desired quantity of liquid compound uniformly over the entire surface of the sheet 30. Thereafter, the sheet 30 passes beneath a strip dryer 38 for eliminating the solvent contained in the liquid compound. The coherent sheet 30 can then be stored on a reel 40 that is rotated by a motor 39.

In a variant, cohesion can be imparted to the sheet by spraying a compound containing a liquid resin, and then curling the resin. Advantageously, a resin is used which can be cured by being exposed to ultraviolet radiation, with the strip dryer 38 being replaced by a UV source. By way of example, such a resin can be a UV-curable acrylate.

Further techniques could also be used, e.g. dusting a powder of heat-fusible or thermo-adhesive polymer onto the sheet, or depositing a heat-fusible or thermo-adhesive film or thread on the sheet, and then exposing it to a heater device. It is also possible to envisage forming "lines of adhesive" on the sheet constituted by an adhesive in solution, with the solvent subsequently being evaporated.

Depending on the weight and the number of tows used, it is possible to obtain a sheet 30 of greater or lesser width.

Starting from tows having a relatively large number of filaments, as already mentioned, the method has the advantage of enabling wide sheets to be obtained, i.e. sheets that are at least 5 cm wide, that are preferably at least 10 cm or more wide, while using a limited number of tows, and thus of spreader devices. Another characteristic of the method is to enable thin sheets to be obtained, weighing no more than 300 g/m$^2$ and of uniform thickness.

A bonding agent can be applied to the sheet for fixing purposes equally well when the sheet is made of continuous filaments and when it is made of discontinuous filaments.

When the sheet is designed to be used to form fiber reinforcement of a composite material part obtained by densifying the fiber reinforcement with a matrix, it is preferable to select the bonding agent as a function of that use. For example, a bonding agent suitable for being sacrificed can be used, which is capable of disappearing by being dissolved or by the application of heat prior to densification by means of the matrix of the composite material. It is also possible to use a bonding agent that is compatible with the matrix, i.e. that is capable of dissolving in the matrix or of remaining without reacting chemically therewith, so that the properties of the matrix are not degraded.

Other methods of fixing that impart sufficient transverse cohesion to the sheet to enable it to be handled can also be envisaged when the sheet is made up of discontinuous filaments. These relate in particular to methods of fixing that serve to attach parallel discontinuous filaments to one another.

FIG. 3 shows the sheet 30 formed by the adjacent unidirectional strips 20a to 20e passing through a device 33 for spraying jets of water under pressure onto the sheet while the sheet is passing over a metal plate 33a. By rebounding on the plate 33a, the jets of water perform a moderate amount of matting of the discontinuous filaments. Thereafter, the sheet 30 passes in front of a drying strip 38 prior to being stored on the reel 40.

In another variant shown in FIG. 4, the strip 30 passes through a needling device 35. This device comprises a needle board 35a driven with vertical reciprocating motion, and a support 35b over which the strip 30 passes. The support 35b has perforations in register with the needles of the board 35a. As a result, the needles penetrate through the entire thickness of the sheet 30 while displacing the discontinuous filaments, thereby giving rise to a limited amount of transverse matting which provides the desired transverse cohesion. The needled sheet is stored on the reel 40.

Although the spreader device shown in FIG. 1 can be used with tows made up of filaments or fibers that are continuous or discontinuous, it is most particularly suitable for tows of continuous filaments.

Figure 5:
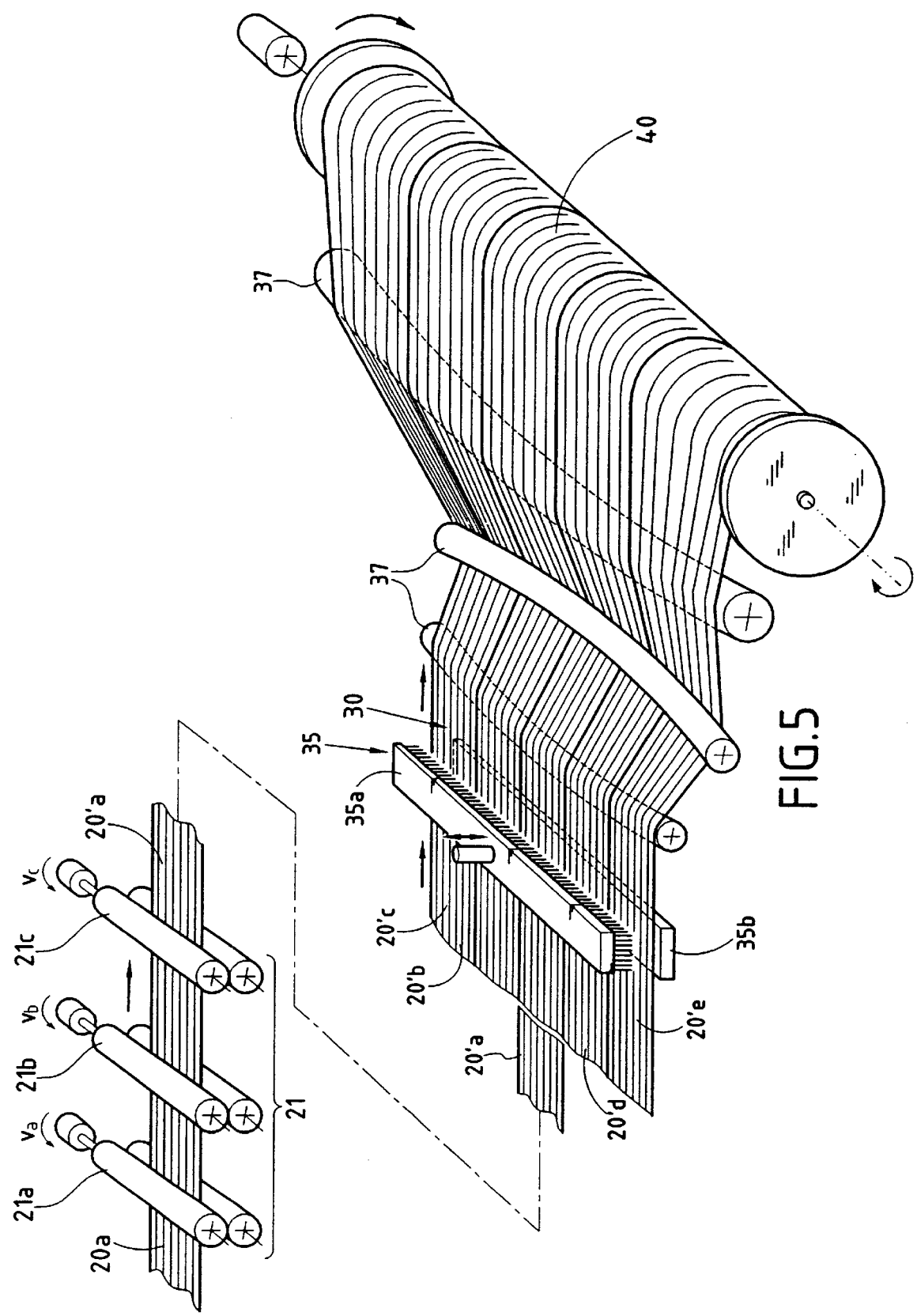
FIG. 5 is a diagrammatic view showing part of the making and widening of a coherent unidirectional sheet that is made up of discontinuous fibers.

Advantageously, the operation of forming a unidirectional sheet or strip made up of discontinuous filaments includes spreading a tow of continuous filaments as shown in FIG. 1, so as to obtain a sheet 20a of continuous filaments. This is taken to a stretching and bursting device 21 (FIG. 5). The stretching and bursting technique is well known per se. It consists in causing the sheet to pass between several successive pairs of drive rolls, e.g. 21a, 21b, and 21c, which are driven at respective speeds $v_a$, $v_b$, and $v_c$ such that $v_c > v_b > v_a$. By drawing the sheet at increasing speeds, the continuous filaments are broken. The distance between the pairs of rolls, and in particular between 21a and 21b determines the bursting pattern, i.e. it determines the mean length of the burst filaments.

After stretching and bursting, the sheet 20'a is stretched, however its weight (per unit area) is significantly reduced compared with that of the sheet 20*a*. The stretched sheet 20'*a* made up of discontinuous filaments is optionally juxtaposed side by side with or partially overlapping other similar sheets 20'*b* to 20'*e*, and is then made coherent by the above-described moderate matting means, e.g. by being subjected to a jet of water under pressure as in the implementation of FIG. 3, or to needling by a needling device 35, as in the embodiment of FIG. 4.

The resulting sheet 30 can be widened so as to further reduce its weight (per unit area), without the sheet losing its cohesion. This ability of being widened is given by the cohesion technique used (water jet or needling).

Widening can be performed, for example, by causing the coherent sheet 30 to pass over one or more pairs of curved rolls 37 prior to being stored on the reel 40.

It will be observed that the sheet can be widened after it has been stored on the reel 40, e.g. when it is taken from the storage reel in order to form a multiaxial sheet.

Other known techniques for obtaining unidirectional sheets by spreading tows can also be used, for example the techniques described in Rhône Poulenc Fibres documents FR-A-2 581 085 and FR-A-2 581 086. In those documents, a tow for spreading is taken to rolls which include resilient elongate elements at their peripheries that are disposed along generator lines and that are provided with spikes. For the portion of its path where it is in contact with a roll, the tow is engaged on the spikes and it is spread by the elastic elements extending parallel to the axis of the roll.

Making a Multiaxial Sheet

Figure 6A:
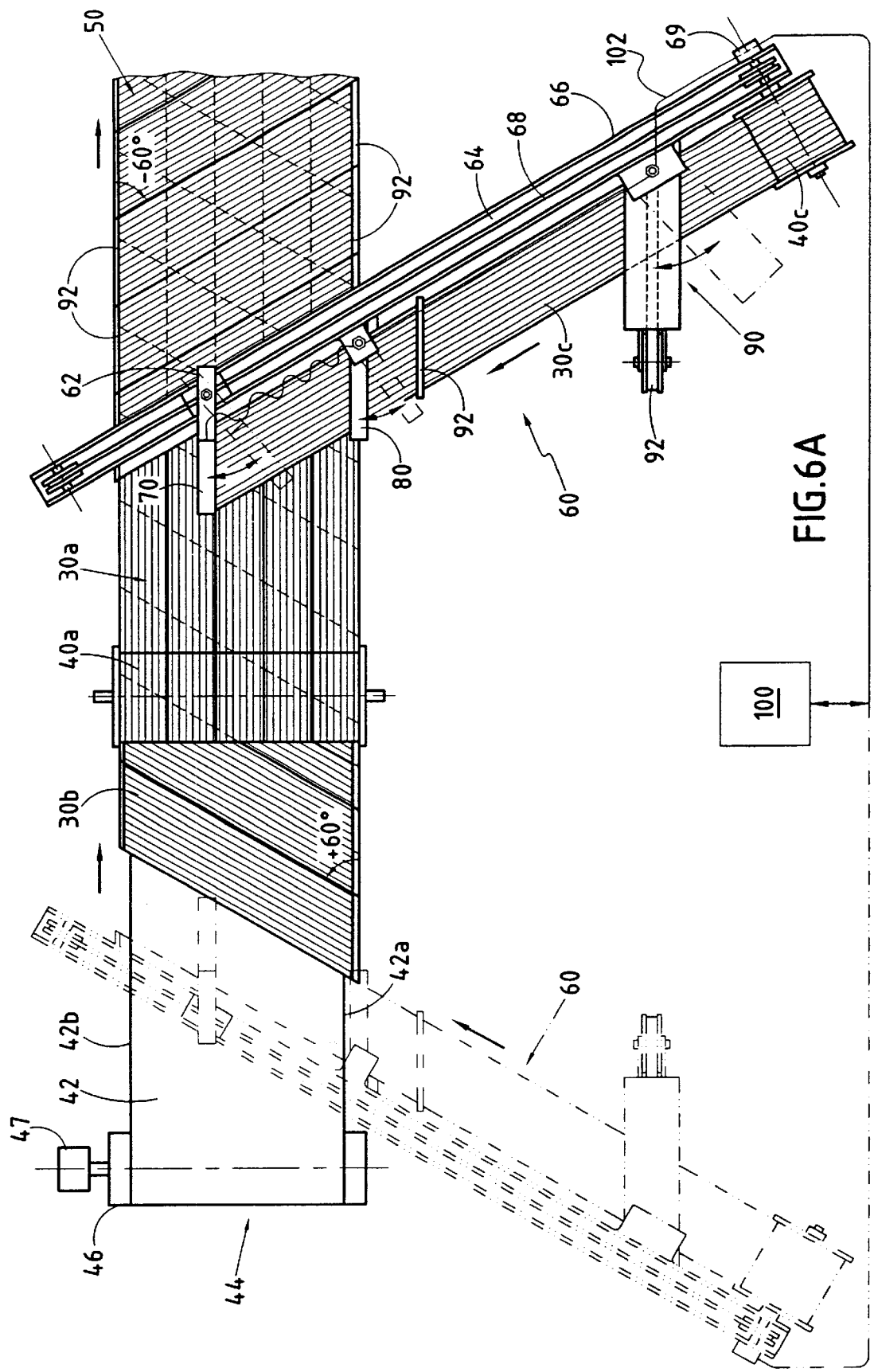
FIGS. 6A and 6B are a highly diagrammatic overall plan view of a laying machine for making multiaxial fiber sheets in an implementation of the invention.
Figure 6B:
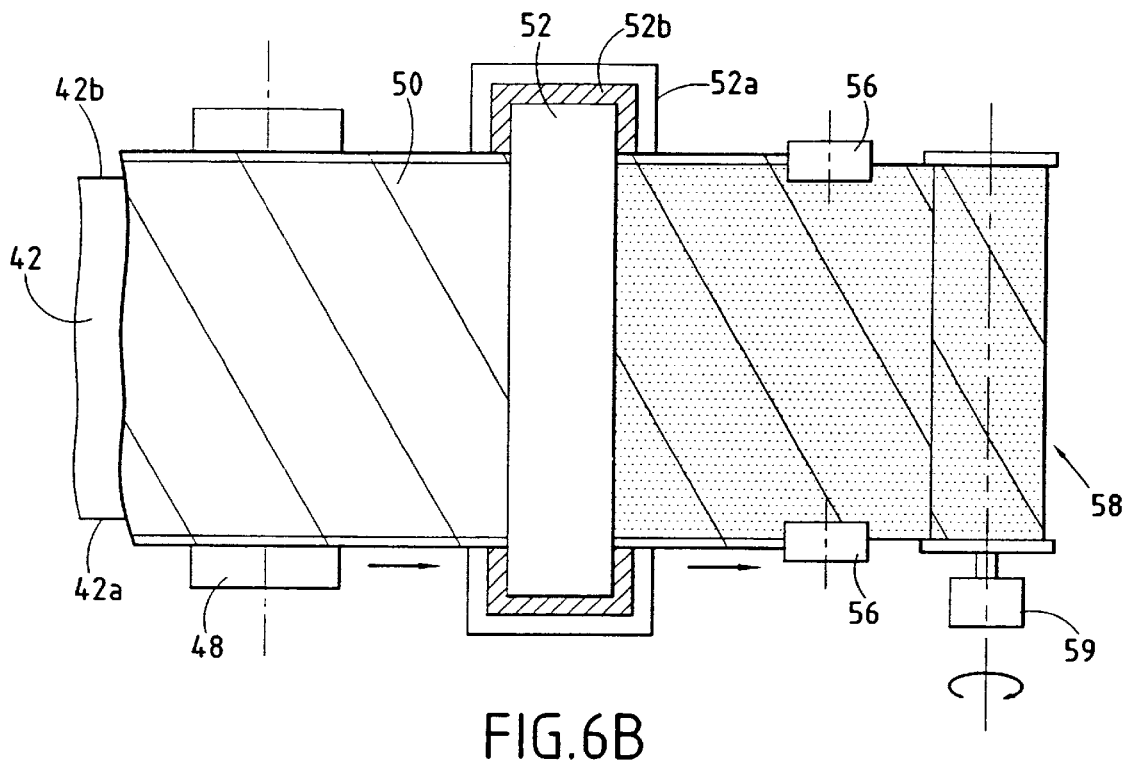

Reference is now made to FIGS. 6A–6B which show a laying machine constituting an embodiment of the invention suitable for making a continuous multiaxial sheet from a plurality of unidirectional sheets, at least one of which can be obtained by a method as described above.

In the example shown, a multiaxial sheet 50 is made up of three unidirectional sheets 30*a*, 30*b*, and 30*c* making the following angles respectively with the longitudinal direction: 0°, +60°, and −60°. The sheet at 0° (sheet 30*a*), i.e. the "main" sheet, is a coherent unidirectional sheet as obtained by the above-described method, unreeled from a reel 40*a*. The transverse sheets at +60° (sheet 30*b*) and at −60° (sheet 30*c*) are unidirectional sheets which can also be coherent sheets obtained by the above-described method and which are unreeled from respective reels 40*b* and 40*c*. The unidirectional sheets used need not necessarily have the same width. Thus, in the example, the transverse sheets 30*b* and 30*c* both have the same width which is smaller than that of the longitudinal sheet 30*a*. In general, the transverse sheets will normally be of a width that is smaller than that of the main sheet (0°).

It will be observed that the angles formed by the transverse sheets relative to the sheet at 0° can be other than +60° and −60°, for example they can be +45° or −45°, or more generally they can be angles that are preferably of opposite sign, but that are not necessarily equal. It will also be observed that more than two transverse sheets can be superposed with the 0° sheet, e.g. by adding a sheet at 90° and/or by adding at least one other pair of sheets forming opposite angles relative to the longitudinal direction.

As shown in FIG. 6A, the multiaxial sheet 50 is formed on a support constituted by a horizontal top segment of an endless belt 42 of a conveyor 44 passing over a drive roll 46 driven by a motor 47, and over a deflection roll 48 (FIG. 6B). It will be observed that the width of the belt 42 is narrower than that of the sheet 50 so that the sheet projects slightly from both sides 42*a* and 42*b* of the belt 42.

The sheet is made by fetching juxtaposed segments 30*b* at +60° onto the belt 42 and then depositing the sheet 30*a* that is oriented at 0° thereon, and then bringing over that juxtaposed segments of the sheet 30*c* oriented at −60°. It is an advantageous feature to be able to make a multiaxial sheet 50 in which the 0° sheet is situated between the transverse sheets, thereby conferring a symmetrical nature to the sheet 50. This is made possible by the cohesion intrinsic to the sheet 30*a*.

Also advantageously, the unidirectional sheet at 0°, as obtained by a method as described above, is of relatively great width, not less than 5 cm, and preferably at least 10 cm, thus making it possible to make multiaxial sheets of great width.

The devices 60 for fetching, cutting, and laying successive segments of the sheets 30*b* and 30*c* are identical, so only the device associated with the sheet 30*c* is described.

The sheet 30*c* is unreeled from the reel 40*c* by means of a grasping head 70 having at least one clamp capable of taking hold of the free end of the sheet 30*c*.

The sheet 30*c* is pulled from an edge 42*a* of the conveyor belt 42 over a length that is sufficient to cover the width of the longitudinal sheet. The segment thus fetched is cut off in the longitudinal direction at the edge of the sheet 30*a* which is situated over the edge 42*a* of the conveyor belt by means of a cutter device 80. Simultaneously, the cutoff segment of sheet 30*c* is fixed by means of its end which has just been cut so as to conserve its position on the conveyor belt relative to the previously fetched segment, and thus relative to the sheets 30*a* and 30*b* which have already been laid.

In order to cut the sheet 30*c* without deformation or fraying, local reinforcement in the form of a segment of film or tape 92 is fixed on each face of the sheet 30*c* at each location where it is to be cut. The film 92 can be fixed, for example, by adhesive, by thermo-adhesive, by high frequency welding, by ultrasound welding, . . . by means of a device 90. For example, a polyethylene film is used that can be fixed by thermo-adhesion. It will be observed that a reinforcing film could be fixed over one face only of the sheet 30*c*.

The grasping head 70 is carried by a block 62 which slides in a slideway 64 of a beam 66. By way of example, the block 62 is fixed on an endless cable 68 driven in the slideway 64 by a reversible motor 69. The beam 66 supports the reel 40*c*, and also the devices 80 and 90 for cutting off and laying segments of the sheet, and for putting reinforcing film into place.

A detailed description of how the head 70 and the devices 80 and 90 are implemented is given below. It will be observed that the grasping head can be swivel mounted relative to the block 62 as can the devices 80 and 90 relative to the beam 66. As a result, the angle made by the deposited transverse sheet relative to the longitudinal direction (0°) can easily be modified by appropriately adjusting the orientation of the beam 66 and by adjusting the positions of the head 60 and of the devices 80 and 90 relative to the beam. Operation of the head 70 and of the devices 80, 90 is controlled by a control unit 100 to which they are connected by a bundle of cables 102 running along the beam 66.

A segment of each sheet 30*b* and 30*c* is fetched, cut off, laid, and fixed while the conveyor 44 is stationary. Thereafter, the conveyor is caused to advance over a length equal to the size of the sheets 30*b* and 30*c* as measured in the longitudinal direction (0°), and the process is repeated. On each advance of the conveyor 44, the same length of the longitudinal sheet is unreeled.

After being superposed, the sheets 30*a*, 30*b*, and 30*c* are bonded together. In the example shown in FIG. 6B, this bonding is performed by needling by means of a needle board 52 which extends across the entire width of the multiaxial sheet 50, as it leaves the conveyor 44. During needling, the sheet 50 is supported by a plate 52*a* carrying a base felt 52*b*, e.g. made of polypropylene, into which the needles can penetrate without being damaged. Needling is then performed each time the conveyor advances. Bonding by needling is particularly suitable for sheets made of discontinuous filaments or of continuous filaments that are not liable to be excessively damaged by the needling.

A discontinuous web of fibers can be applied to the multiaxial sheet immediately prior to needling, so as to supply discontinuous fibers suitable for being taken by the needles so as to be introduced transversely into the multiaxial sheet, thereby bonding it.

After needling, the marginal zones of the multiaxial sheet 50, carrying portions of the reinforcing film 92 can be eliminated by being cut off by means of rotary cutter wheels 56 situated on both sides of the sheet. The resulting multiaxial sheet can be stored on a reel 58 driven by a motor 59, synchronously with the intermittent advance of the conveyor 44.

Figure 7:
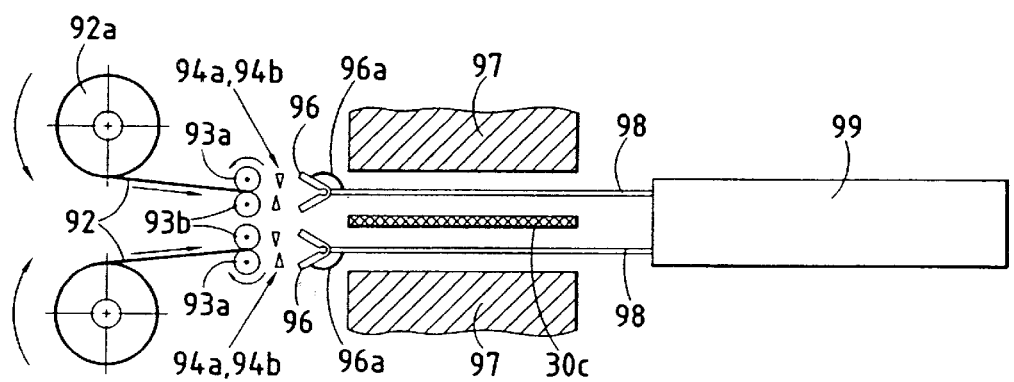
FIG. 7 is a diagrammatic elevation view showing a detail of the device for putting local reinforcing films into place in the machine of FIGS. 6A–6B.

Reference is now made to FIG. 7 which shows in highly diagrammatic manner, greater detail of the device 90 for putting reinforcing films 92 into place by thermo-adhesion.

Each film 92 is pulled from a respective storage reel 92*a* and passes between two reels 93*a*, 93*b*, one of which (e.g. 93*a*) is coupled to a drive motor (not shown) which may be common to both reels 93*a*. Two clamps 96 are opened and closed under the control of actuators 96*a*, and are fixed at the ends of rods 98 secured to the same cylinder of a pneumatic actuator 99. The two rods 98 extend respectively above and below the path of the sheet 30*c* as pulled from the reel 40*c*, and they are of a length that is longer than the width of the sheet.

Two heating presses 97 are disposed on either side of the path of the sheet 30*c*. Two blades 94*a* co-operating with backing blades 94*b* are disposed immediately downstream from the pairs of reels 93*a*, 93*b* so as to be able to section the films 92 under the control of actuators (not shown).

Figure 8A:
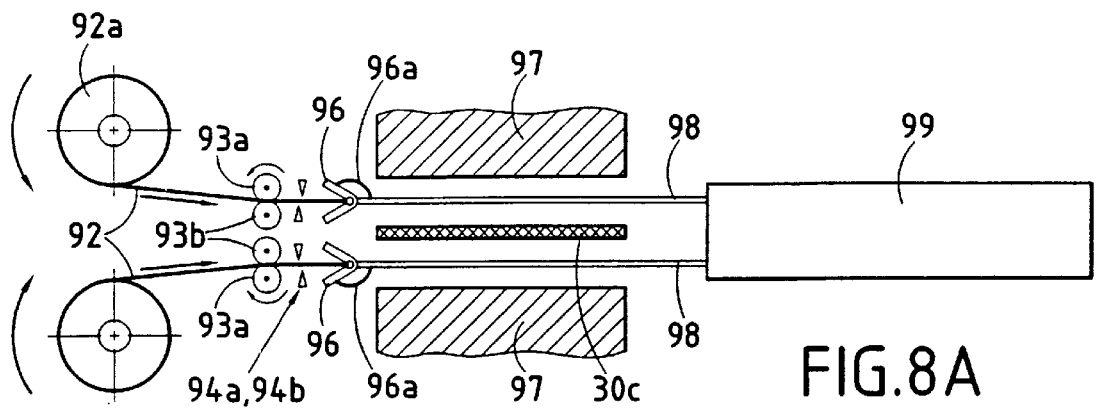
FIGS. 8A to 8C show the successive steps of putting the reinforcing film into place using the FIG. 7 device.
Figure 8B:
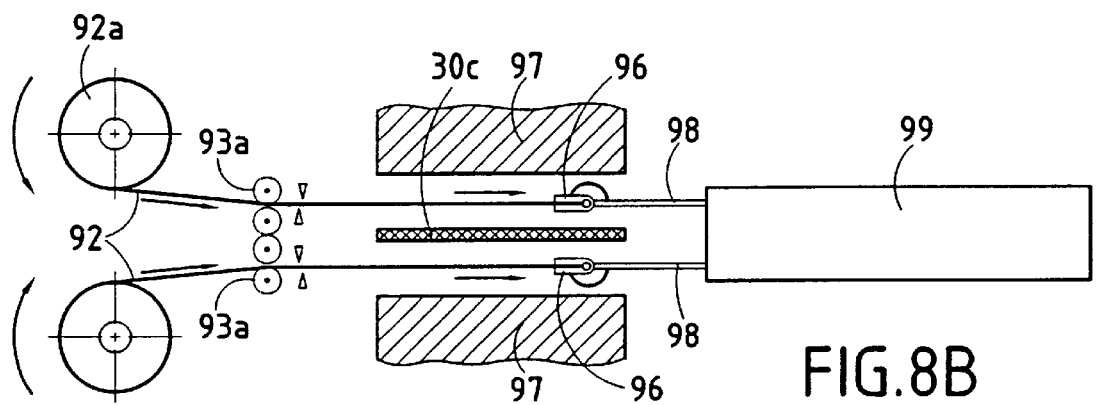
Figure 8C:
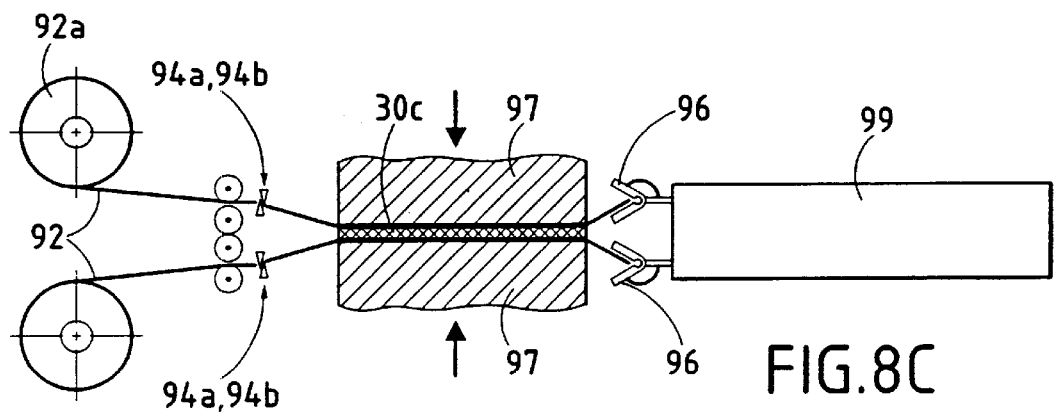

A cycle for putting the reinforcing films 92 into place comprises the following operations as illustrated in FIGS. 8A to 8C.

Starting with the rods 98 that carry the clamps 96 in their most advanced position, beyond the edge of the sheet 30*c* opposite from the edge adjacent to the actuator 99, the films 92 are advanced by means of the reels 93*a*, 93*b* until their free ends are fully engaged in the clamps 96 which are in the open position (FIG. 8A). The drive wheels 93*a* can be stopped either in response to detecting that the ends of the films 92 are home in the clamps 96 by using appropriate sensors, or else after the films have been advanced through a predetermined length.

The clamps 96 are closed under the control of actuators 96*a*, the reels 93*a* are declutched, and the actuator 99 is controlled to retract the rods 98 and to pull the films 92 to beyond the edge of the sheet 30*c* on the same side as the actuator 99 (FIG. 8B).

The heating presses 97 are applied on either side of the sheet 30*c* against the segments of film 92 that are situated on each face of said sheet so as to fix said segments by thermo-adhesion. As soon as the presses 97 have been applied, the clamps 96 are opened and the blades 94*a* are actuated so as to cut the films 92, thereby releasing the blade segments of film during thermo-adhesion (FIG. 8C).

After the presses 97 have been withdrawn and the sheet 30*c* has been advanced, the rods 98 are again brought into the advanced position by the actuator 99, and the film-laying cycle can then be repeated.

Figure 9:
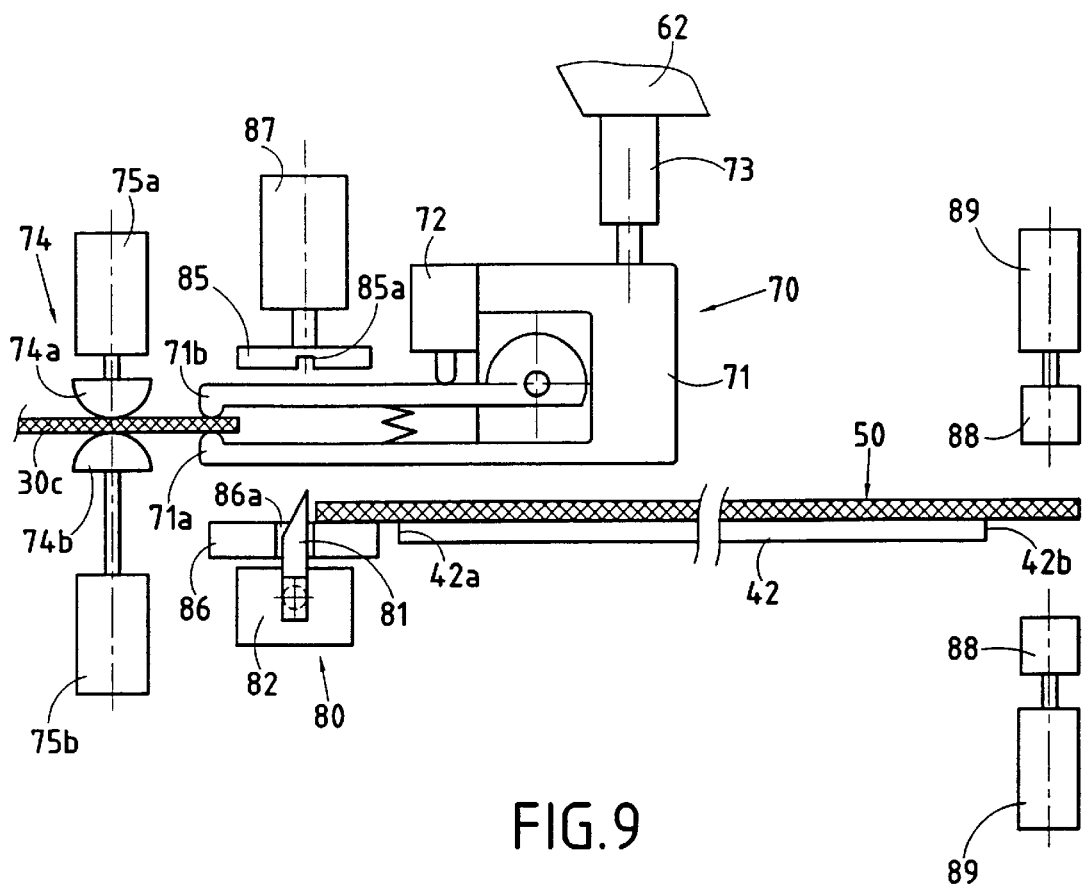
FIG. 9 is a diagrammatic view in lateral elevation showing a detail of the device in the machine of FIGS. 6A–6B for cutting the transverse unidirectional sheet into segments and for fixing a cutoff segment.
Figure 10:
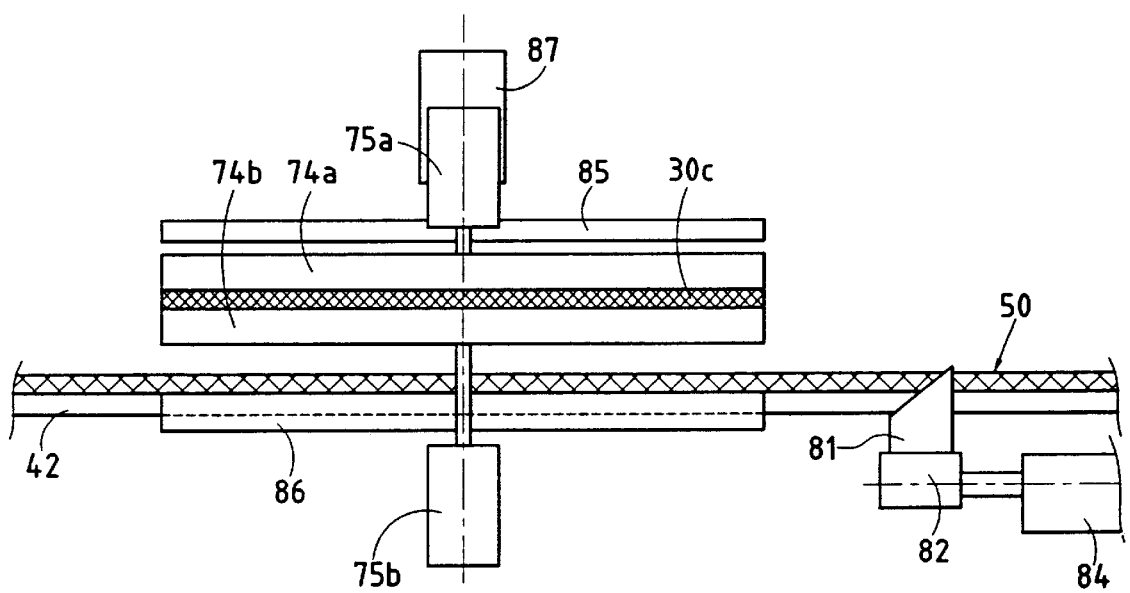
FIG. 10 is a diagrammatic end elevation view of the cutting and fixing device of FIG. 9.

Reference is now made to FIGS. 9 and 10 which show in greater detail but in highly diagrammatic manner the grasping head 70 and the device 80 for cutting and fixing segments of the transverse sheet. The grasping head 70 comprises a clamp 71 having two elements 71*a* and 71*b* for taking hold of the free end of the sheet 30*c*. Opening and closing of the clamp 71 are under the control of an actuator 72 which acts on the top element 71*a*. In addition, the clamp 71 is movable between a position in which it is close to the plane of the conveyor belt 42, and a position in which it is moved away from said plane under the control of another actuator 73 which is fixed to the block 62 and which supports the clamp 71.

In the vicinity of the edge 42*a* of the conveyor belt 42 situated on the side from which the sheet 30*c* is fetched, there is situated a guide device 74 in the form of a clamp. This clamp comprises a top element 74*a* that is movable under the control of an actuator 75*a* between a high position away from the plane of the conveyor belt 42 and a low position that is situated practically in said plane. The clamp 74 also has a bottom element 74*b* that is movable under the control of an actuator 75*b* between a low position situated practically in the plane of the conveyor belt 42 and a high position at a distance from said plane.

The cutting device 80 comprises a blade 81 mounted on a support 82 situated beneath the plane of the conveyor belt 42. The support 82 can slide along the edge 42*a* of the belt 42 under the control of an actuator 84. A presser device 85 is disposed above the plane of the conveyor belt 42 so as to press the sheet 30*c* onto a support 86 while a segment of the sheet is being cut off. The application of pressure and the withdrawal of the presser device 85 are controlled by an actuator 87. The support 87 and the presser device 85 have respective slots 85*a* and 85*a* for passing the blade 81.

The presser device 85 and the support 86 are also heater elements so as to constitute a heating press capable of clamping against the edges of the multiaxial sheet 50 that is being built up on the side 42*a* of the conveyor belt. A heating press made of two similar elements 88 under the control of actuators 89 can be provided on the opposite side 42*b* of the conveyor belt.

The width of the conveyor belt 42 is less than the width of the multiaxial sheet 50 being built up so as to leave the space required on the side 42*a* for the cutting device 80 and on the side 42*b* for optional heating presses 88.

A cycle of fetching, cutting off, and fixing a segment of transverse sheet 30*c* comprises the following operations, as illustrated in FIGS. 11A to 11C.

The free end of the sheet 30*c* in the vicinity of the side 42*a* of the conveyor belt 42 is held by the clamp 74 with its elements 74*a* and 74*b* in the high position. The grasping head 70 has its clamp 71 in the high position and it is situated at the end of its stroke on the side 42*a* of the conveyor belt. In this position, the clamp 71 can be closed by the actuator 72 to take hold of the end of the sheet 30*c* (FIG. 11A).

The clamp 74 is opened by lowering its bottom element 74*b*, and the block 62 is moved by the motor 69 to bring the clamp 71 to the other end of its stroke, a little beyond the side 42*b* of the conveyor belt 42 (FIG. 11B).

The clamp 71 is lowered as is the top element 74*a* of the clamp 74 so as to press the segment of sheet 30*c* against the conveyor belt 42 which is already supporting the sheets 30*b* and 30*a*. The presser device 85 is lowered by means of the actuator 87 so as to press the sheet 30*c* against the support 86. The blade 81 is then moved longitudinally so as to cut the sheet 30*c* (FIG. 1C). The sheet 30*c* is cut at the location where the reinforcing films 92 have been fixed, with the distance between the devices 80, 90 for laying the reinforcing films and for cutting the transverse sheet being equal to the transverse advance distance of the sheet 30c, i.e. to the length of the segment of sheet 30c to be cut off.

The heating elements 85 and 86 are controlled to produce the heat required for causing the cutoff portions of the reinforcing films 92 to adhere to the edge of the multiaxial sheet situated on the side 42a of the conveyor belt 42 so as to fix the position of the cutoff segment of sheet 30c on this side. The other film portions 92 which remain secured to the free end of the sheet 30c after cutting can be caused to adhere by means of the heating presses 88 to the other side of the multiaxial sheet 50. As a result, each cutoff segment of the sheet 30c is held in position relative to the remainder of the multiaxial sheet during formation thereof. This avoids any untimely displacement of the segments of the transverse sheet during the advances of the conveyor belt 42 prior to the multiaxial sheet being finally fixed.

The clamp 71 can then be opened and returned to its high position prior to being moved back towards the side 42a of the conveyor belt, while the clamp 74 is returned to its high position so as to present the free end of the sheet 30c in the desired position to the grasping head.

Variant Embodiments

The above-described laying machine operates with discontinuous advance of the multiaxial sheet while it is being formed. In order to increase production throughput and improve compatibility with the operation of the means for bonding together the superposed unidirectional sheets when said bonding is performed by sewing or by knitting, it can be preferable to cause the laying machine to operate with advance that is continuous.

Figure 12:
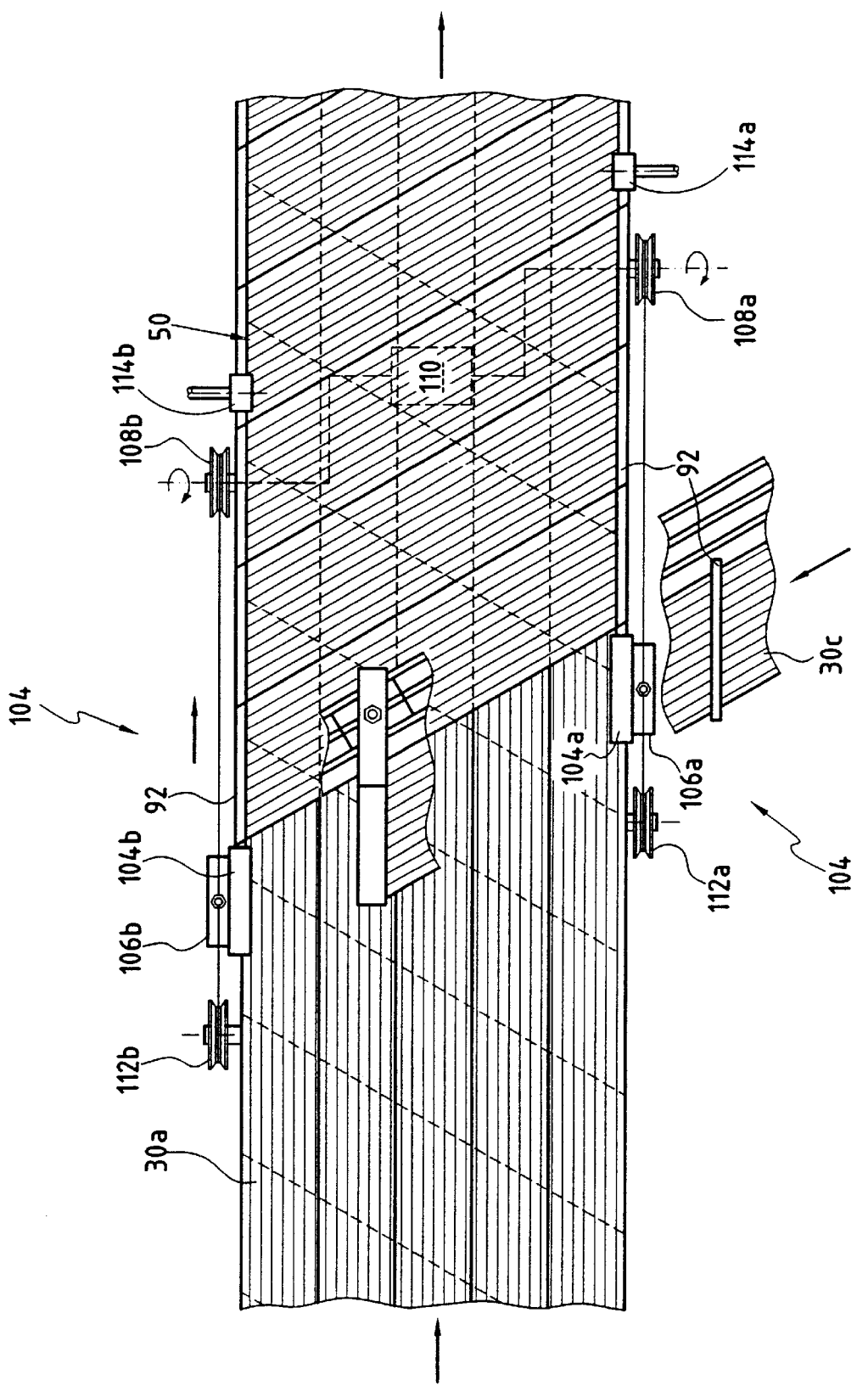
FIG. 12 is highly diagrammatic and shows part of a variant embodiment of the laying machine of FIGS. 6A–6B.

To this end (FIG. 12), the cutoff segments of transverse sheet are taken hold of by a transfer device 104 to be brought successively onto the multiaxial sheet 50 that is being formed and that is advancing continuously. The transfer device 104 has two pairs of clamps 104a, 104b carried by blocks 106a, 106b which are movable in translation parallel to the advance direction on either side of the conveyor belt 42. To this end, the blocks 106a and 106b are fixed on endless cables which pass over drive wheels 108a and 108b driven by a motor 110 and over two deflector wheels 112a and 112b. Two pairs of heating presser wheels 114a and 114b serve to fix a segment of transverse sheet by thermoadhesive of the films 92 at the ends of the segments of sheet, as soon as it has been laid.

Each segment of transverse sheet is fetched and cut off by a cross-laying device 60 similar to the machine shown in FIGS. 6A–6B, except that the cutter device 80 is carried by the beam 66 and the heating presses for fixing the cutoff segments of sheet are not provided.

Laying is performed by fetching and cutting off each segment by means of the cross-laying device and by taking hold of the cutoff segment, as soon as it has been released by the cross-laying device by means of clamps 104a, 10 4b. These are moved synchronously by the motor 110 at a determined speed to bring the cutoff segment into contact with the previously-laid segment and into the desired position (adjacent or with overlap). Thereafter the clamps 104a, 104b are returned to their initial position to transfer the following cutoff segment of sheet.

In another variant, and also for the purpose of increasing production throughput, each cross-laying device that fetches, cuts off, and lays successive segments of transverse sheet has a plurality of grasping heads that are moved along a path in a closed loop. As a result, while one grasping head is returning, another grasping head can be in action.

FIGS. 13A to 13D show the successive steps of fetching, cutting off, and fixing a segment of transverse sheet.

The cross-laying device differs from that of FIGS. 6A to 11C in that it has a plurality, e.g. two grasping heads $70_1$ and $70_2$ mounted on an endless transporter 76 using a belt or a chain. The transporter 76 has its bottom and top lengths extending above the conveyor belt 42, parallel thereto, and in the laying direction for the transverse sheet 30c that is to be laid. The transporter 76 passes over a drive wheel 76a and a return wheel 76b situated on opposite sides of the conveyor belt 42. The heads 70 are mounted at opposite locations on the transporter 76.

Each head $70_1$ and $70_2$ has a shoe 77 fixed at the end of an actuator 78. Connection between a grasping head and the free end of the sheet 30c is provided by means of adhesive sprayed onto the shoe 77 by an adhesive nozzle 79 situated above the top length of the transporter 76 in the vicinity of the end of the return path.

The cross-laying device of FIGS. 13A to 13D also differs from that of FIGS. 6A to 11C in that the presser device 85 is applied and withdrawn, not under the control of actuator means driven perpendicularly to the sheet, but by using a pivoting mount. The presser device 85 is connected to a support 85b by means of hinged links 85c. The hinged links 85c are driven by a motor member (not shown) to move the presser device 85 along a circular arc between a front position over the blade 81, and a rear position in which a passage for the grasping head is left clear. The support 85b is movable under drive of an actuator 85e between a raised position above the plane of the sheet 50 and a lowered position substantially level with the sheet 50. It will also be observed that the guide device 74 of FIGS. 9 to 11C is now superfluous. Operation is as follows.

Figure 13A:
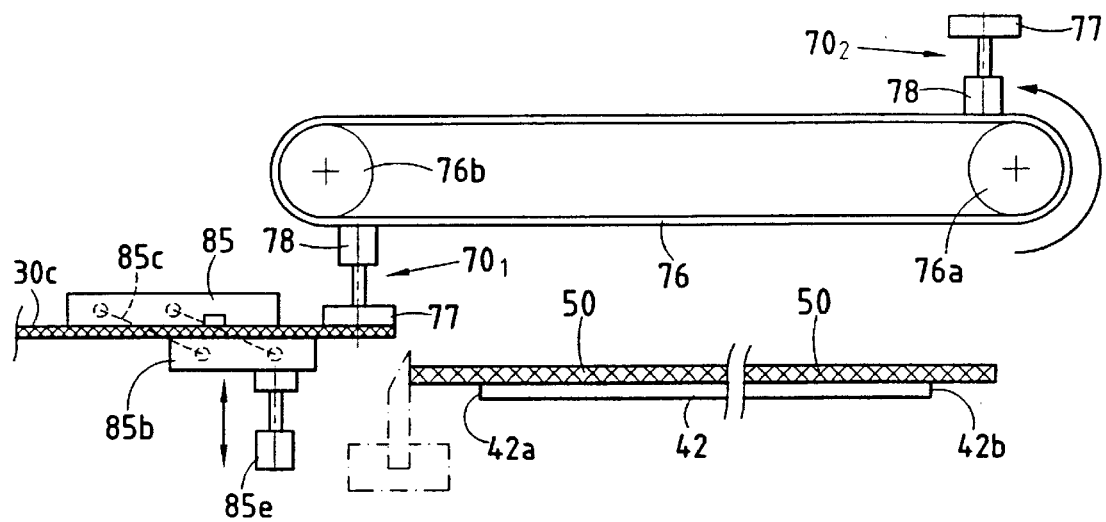
FIGS. 13A to 13D show the successive steps of fetching, cutting, and fixing a segment of a transverse unidirectional sheet in another variant embodiment of the laying machine of FIGS. 6A to 6B.

Starting with the support 85b in the high position and the presser device 85 in the rear position, a grasping head $70_1$ on which adhesive has been sprayed comes into contact with the free end of the sheet 30c (FIG. 13A).

Figure 13B:
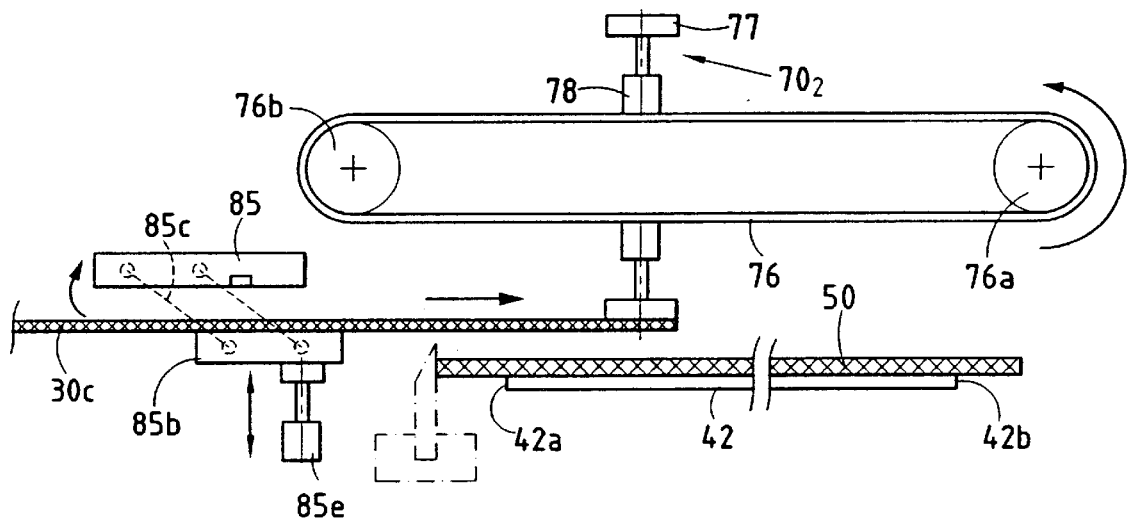

The presser device 85 is raised by means of the links 85c and the transporter 76 is driven so that the free end of the sheet 30c is taken towards the side 42b of the conveyor belt 42, over the sheet 50 (FIG. 13B).

Figure 13C:
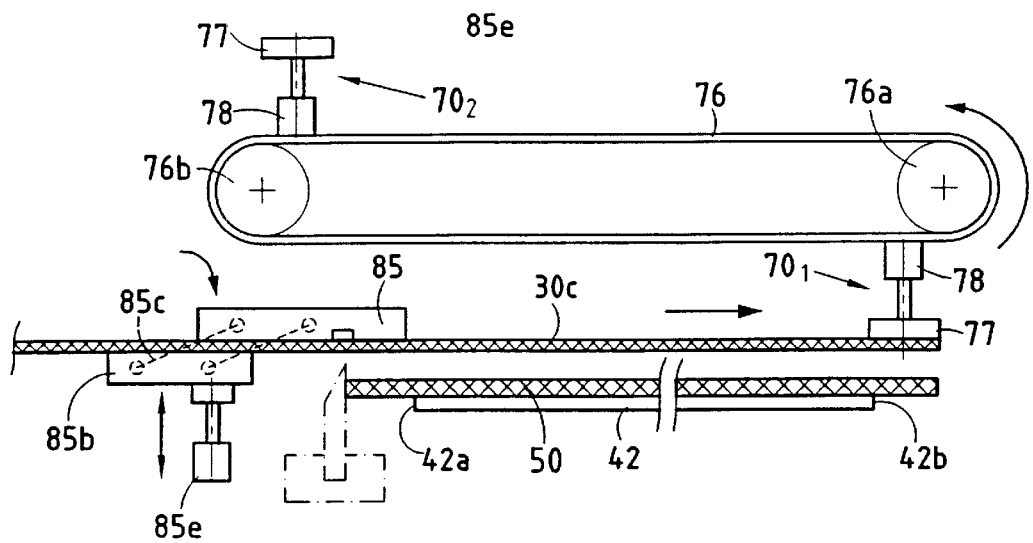

When the free end of the sheet 30c has come into position, the transporter 76 is stopped, the presser device 85 is tilted into its forward position, thereby holding the sheet 30c in the tensioned state between the grasping head 70, and the presser device 85 (FIG. 13C).

Figure 13D:
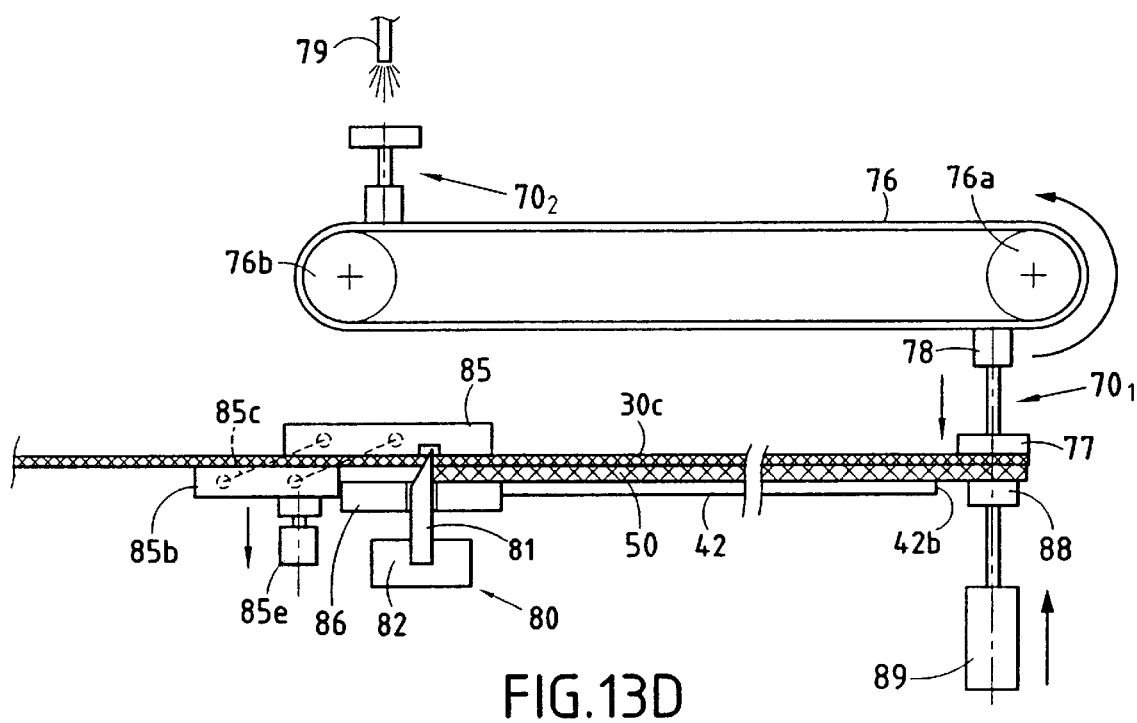

Thereafter, the actuator 85e and the actuator 78 of the head 70 are controlled to press the sheet 30c onto the sheet 50 (FIG. 13D). The segment is then cut off by means of the blade 81 passing through the slot 85a. Simultaneously, the edges of the cutoff segment are caused to adhere by means of the presser device 85 and the support 86 constituting a heating press, and by pressure from the head 701 on the heating element 88. It will be observed that a single heating element 88 is provided, unlike the embodiment of FIG. 9. At the same time, adhesive is sprayed onto the head $70_2$ by means of the nozzle 79. Thereafter, the head $70_1$ is raised and then the transporter 76 is again driven so that a new laying cycle can start using the head $70_2$.

In the above, provision is made to fix the ends of the transverse sheet segments temporarily by thermo-adhesive along one or both longitudinal edges of the multiaxial sheet, with the marginal portions thereof subsequently being eliminated.

Figure 14:
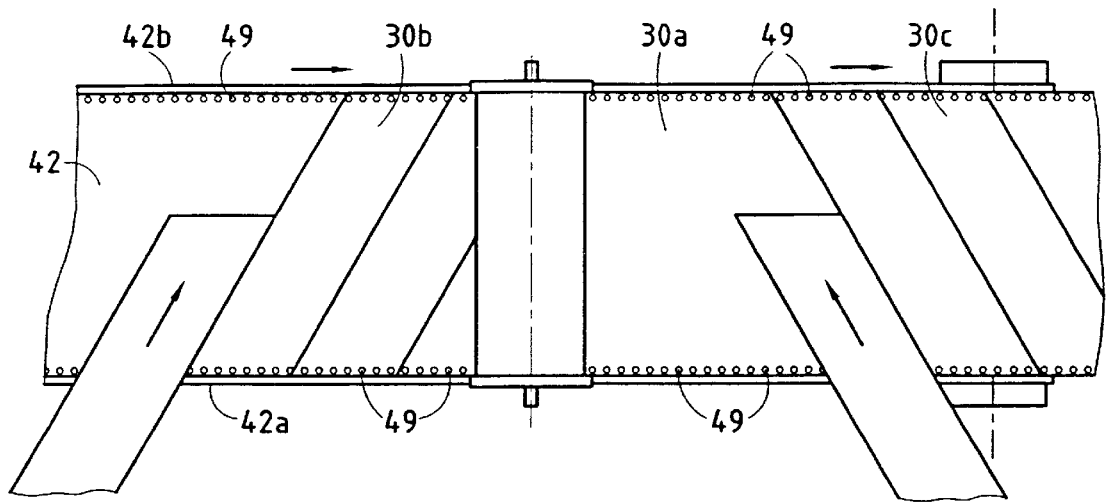
FIG. 14 is highly diagrammatic and shows a variant implementation of the fixing of segments of transverse unidirectional sheet in a laying machine such as that of FIGS. 6A–6B.

In a variant, temporary fixing of the transverse sheet segments can be provided by means of two longitudinal rows of spikes 49 along the edges 42a, 42b of the conveyor belt (FIG. 14). The transverse sheet segments are engaged at their ends on the spikes 49 when they are pressed against the conveyor belt 42 by lowering the clamps 71, 74 or by means of the transfer device of FIG. 12.

Figure 15:
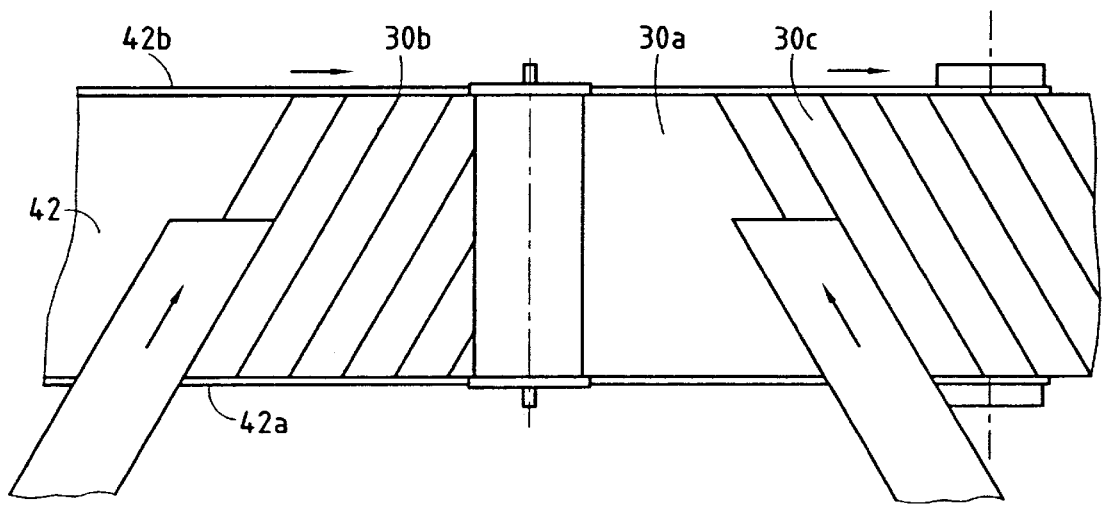
FIG. 15 is highly diagrammatic and shows a variant implementation of laying transverse unidirectional sheets.

In another variant, the successive segments of the transverse sheet can be placed not adjacent to one another, but with partial overlap (FIG. 15). The degree of overlap is adjusted by adjusting the speed of the conveyor 44 between two successive transverse sheet segments being brought into position. Such partial overlap makes it possible to avoid difficulties that can be encountered when placing transverse sheet segments edge to edge. Under such circumstances, lightweight transverse sheets are used as can be obtained after being spread as shown in FIG. 5.

Although the above-described method of laying transverse sheets by fetching successive segments constitutes a preferred implementation of the invention, the possibility of using other laying techniques, in particular when the transverse sheets are of relatively small width, is not excluded.

Figure 16:
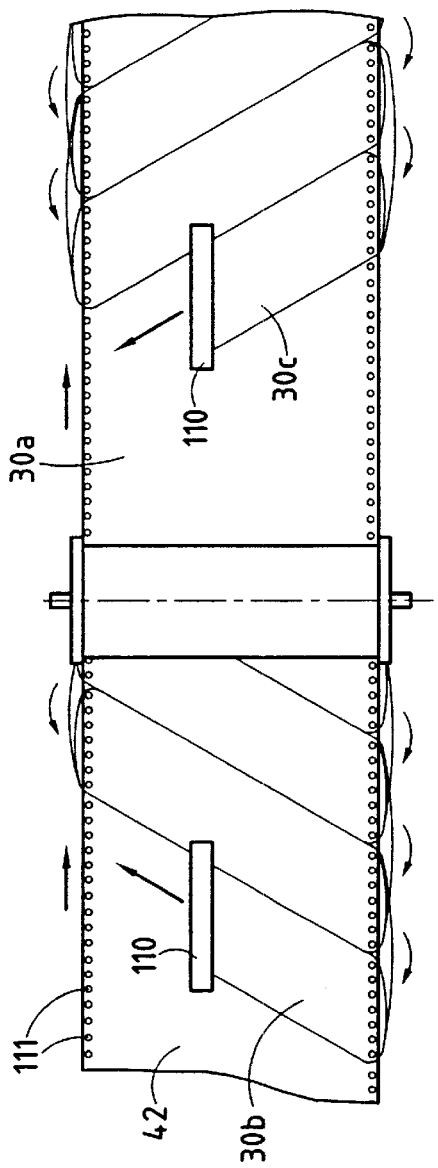
FIG. 16 is highly diagrammatic and shows a variant implementation of laying in which the transverse unidirectional sheets overlap partially.

Thus, as shown very diagrammatically in FIG. 16, it is possible to use a technique of a type similar to that described in above-mentioned document U.S. Pat. No. 4,677,831. In that technique, the ends of the transverse sheets 30b, 30c are fixed on cross-laying carriages 110 which are driven with reciprocating motion in translation parallel to the directions of the transverse sheet. The sheets 30b and 30c are unreeled from reels (not shown) optionally carried by the cross-laying carriages. At each end of the stroke of a cross-laying carriage, the transverse sheet is turned by passing over spikes 111 carried by the conveyor belt 42 along each of its longitudinal sides.

FIG. 6B shows superposed sheets being bonded together by needling. Other bonding methods can be used.

Figure 17:
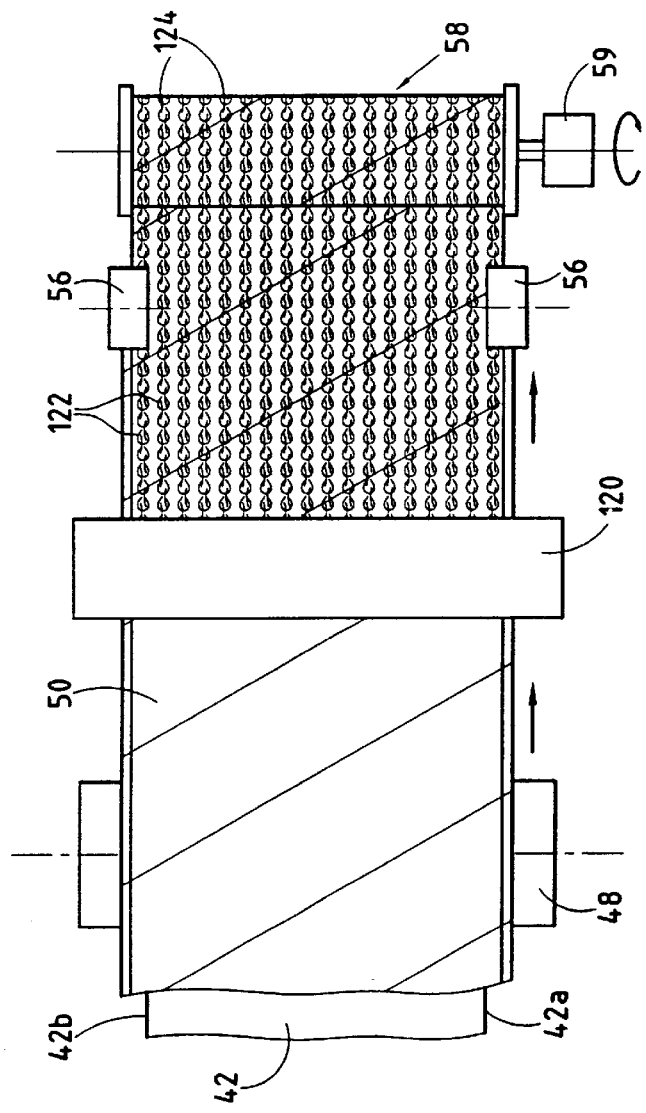
FIGS. 17, 18, and 19 are highly diagrammatic and show first, second, and third variant embodiments of the means for bonding together the superposed unidirectional sheets in a laying machine.

Thus, FIG. 17 shows bonding by stitching by means of a device 120 situated immediately downstream from the conveyor 44. The stitching can be performed using various different stitches, e.g. chain stitch 122, as is conventional. By way of example, the sewing thread 124 used can be a thread of polyester, glass, carbon, aramid, . . . It is also possible to provide bonding by knitting, e.g. using a zigzag knitting stitch.

Figure 18:
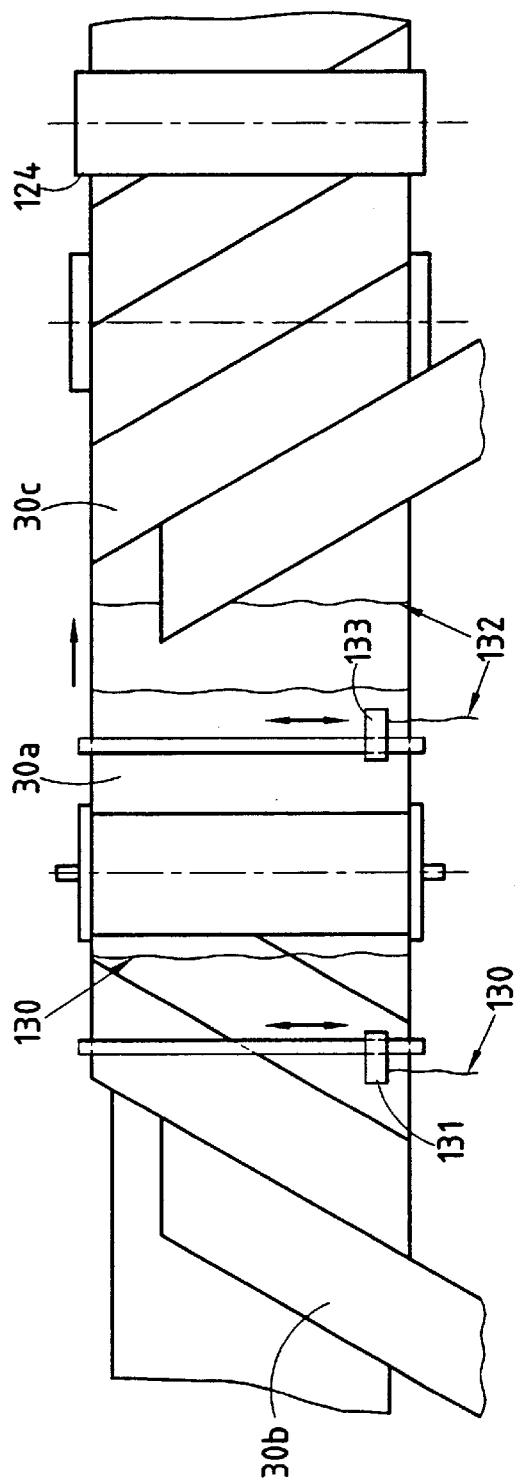

FIG. 18 shows bonding by means of heat-fusible threads which are introduced between the unidirectional sheets. A first heat-fusible thread 130 is placed on the sheet segments 30b by a cross-laying device 131 prior to the sheet 30a being laid, and a second heat-fusible thread 132 is placed on the sheet 30a by a cross-laying device 133 prior to the sheet segments 30c being laid. Immediately downstream from the conveyor 44, the multiaxial sheet 50 passes between two heater rolls 124 that cause the threads 130 and 132 to melt, thereby providing cohesion for the multiaxial sheet. By way of example, the threads 130 and 132 are glass threads coated in polypropylene. Instead of heat-fusible threads, it would be possible to use a heat-fusible film, or a thermo-adhesive film or thread.

Figure 19:
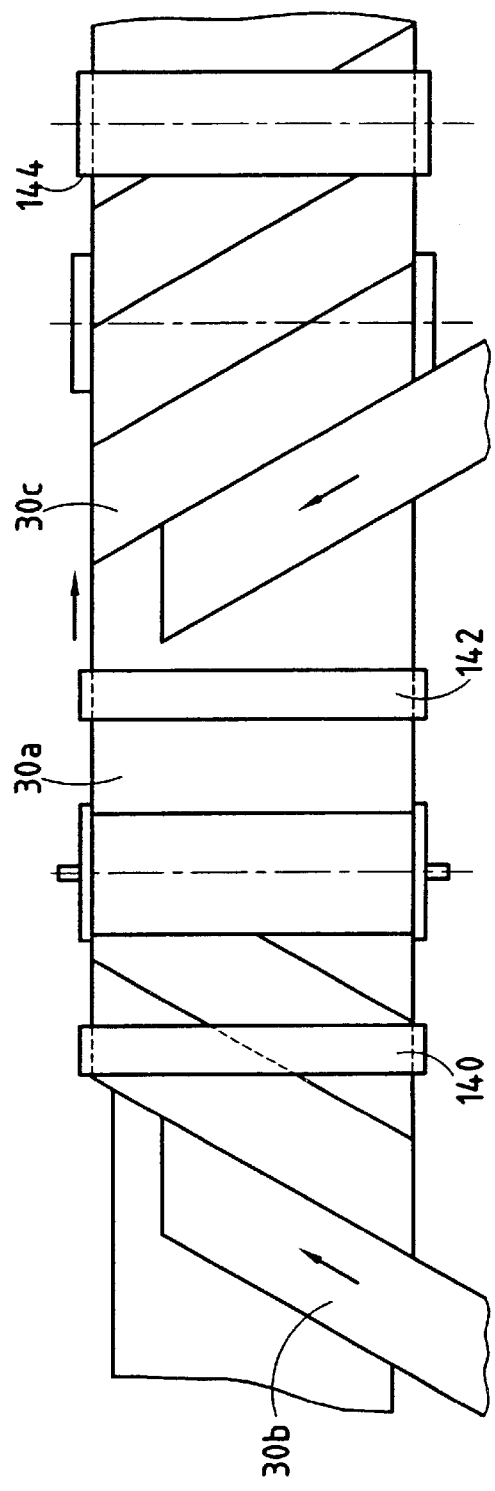

Finally, FIG. 19 shows bonding by adhesive. Strips 140 and 142 for spraying adhesive agent are disposed across the conveyor belt 42 immediately downstream from the station for laying the unidirectional sheet 30a and the station for laying the unidirectional sheet 30c. Immediately downstream from the conveyor 44, the multiaxial sheet 50 passes between two rolls 144.

When cohesion of the unidirectional sheets is obtained by a heat-fusible or thermo-adhesive bonding agent, bonding between the unidirectional sheets can also be obtained by thermally reactivating the bonding agent.

The method and the machine for laying as described above serve to make multiaxial sheets comprising an arbitrary number of superposed sheets. Thus, it is possible to form a multiaxial sheet that does not have a longitudinal unidirectional sheet (0°) by placing at least two transverse unidirectional sheets. In this case, and preferably, the transverse sheets comprise at least one pair of sheets whose directions are at opposite angles relative to the longitudinal direction, optionally together with a transverse sheet at 90°. When a longitudinal unidirectional sheet is provided, as already mentioned, at least one pair of transverse sheets are placed on opposite faces of the longitudinal sheet and at opposite angles relative thereto; in this case also it is possible to add at least one transverse sheet at 90°.

The resulting multiaxial sheets can be used for making the reinforcement of composite material parts, e.g. by well-known techniques of draping or needling superposed plies. The resulting reinforcement is then densified by a matrix obtained by chemical vapor infiltration or by a liquid process (impregnating with a matrix precursor in the liquid state, e.g. resin, followed by transforming the precursor, e.g. by heat treatment), or indeed by califaction. With califaction, the preform is immersed in a liquid precursors of the matrix and the preform is heated, e.g. by contact with an inductor core or by direct coupling with an inductor coil, such that the precursor is vaporized on coming into contact with the preform and can infiltrate to form the matrix by being deposited within the pores of the preform.

EXAMPLES

Examples of making multiaxial sheets are described below by way of illustration.

Example 1

A tow of high-strength carbon fibers constituted by 480,000 continuous filaments (480 K) weighing 30,000 tex, having breaking strength in traction of 3600 MPa and a modulus of 250 GPa was spread over a width of 150 mm by means of an installation similar to that of FIG. 1. The spread tow was subjected to a stretching and bursting operation during which the continuous filaments were transformed into discontinuous filaments, the majority of which were of a length lying in the range 25 mm to 170 mm. During bursting, the spread tow was subjected to stretching by a factor of 2 and its weight (per unit area) was reduced, giving a unidirectional sheet having a width of 150 mm and a weight of 110 g/m$^2$.

The sheet was fixed by disorienting the fibers slightly, the great majority of them remaining parallel to the sheet direction. The disorientation was performed by subjecting the sheet situated over a metal plate to a jet of water under a pressure of at least 100 bars.

The resulting sheet was quite capable of being handled.

Two similar unidirectional sheets were laid by means of a machine similar to that shown in FIGS. 6A and 6B to form angles of +45° and −45° relative to the longitudinal direction (0°) of the resulting sheet. The sheets were bonded together by light needling, the density of needling being about 20 strokes/cm$^2$. A sheet was obtained having two axes ±45° and a weight of 220 g/m$^2$.

Plies were cut out from the two-axis sheet and superposed so as to make reinforcement for a carbon-carbon composite material part to be manufactured. The plies were bonded together by needling while they were being superposed, in well-known manner, e.g. as disclosed in document U.S. Pat. No. 4,790,052.

The resulting preform was densified by a carbon matrix deposited by chemical vapor infiltration.

Example 2

The two-axis sheet of Example 1 was fixed not by needling, but by stitching using a zigzag knit stitch parallel to the longitudinal direction. The knitting thread was a 150 dtex cotton thread having two strands. A two-axis sheet was obtained that was quite capable of being handled.

Example 3

The tow of Example 1 as spread and fixed by a jet of water after stretching and bursting was enlarged by being passed over curved bars to increase its width from 80 mm to 120 mm. Two similar unidirectional sheets obtained in this way were laid at +45° and −45°, as in Example 1, but with 50% overlap between successively-laid segments of sheet. The two-axis sheet was fixed by needling, as in Example 1. A two-axis sheet was obtained weighing 530 g/m² and that was quite capable of being handled.

Example 4

Four tows of 320 K filaments each and constituted by discontinuous carbon fibers were spread side by side to form a unidirectional sheet that was 600 mm wide and weighed about 140 g/m². The sheet was fixed by pre-needling at a density of 30 strokes per cm².

Three similar unidirectional sheets were laid in directions respectively equal to 0°, +60°, and −60°, by means of a laying machine as illustrated in FIGS. 6A–6B. The sheets were bonded together by needling, using a density of 30 strokes per cm². The resulting three-axis sheet weighed 420 g/m². It was particularly suitable for making preforms for composite material parts by stacking and needling flat plies, or by winding and needling on a mandrel.

Example 5

Four high-strength carbon tows each having 50 K filaments and made of preoxidized polyacrylonitrile (PAN) carbon precursor were spread and burst together as described in Example 1. The resulting unidirectional strip was 8 cm wide and weighed 170 g/m².

A carbon fiber tow having 320 K filaments, made of isotropic pitch precursor, was burst in the same manner so as to obtain a unidirectional strip having a width of 8 cm and a weight of 230 g/m².

Two burst strips of that type based on isotropic pitch precursor were interleaved with eight burst strips of the preceding type based on preoxidized PAN precursor and the assembly was passed once through a gill box or an "intersecting" type machine in which all ten strips were combed and stretched so as to obtain a burst sheet made up of an intimate mixture of different precursor fibers, weighing 250 g/m², and a width of 10 cm.

The resulting hybrid sheet was fixed by being subjected to a jet of water under pressure, with the sheet th en being situated over a metal plate.

A three-axis sheet with axes at 0°, +60°, and −60° was made using three unidirectional sheets as made in that way.

Example 6

Tows of high-strength carbon fibers and each having 12 K filaments were spread so as to bring their width to about 7 mm. Three unidirectional sheets of width equal to about 100 mm and weighing 125 g/m² were formed by juxtaposing spread tows, as was a unidirectional sheet of width equal to 100 cm and having the same weight (per unit area). The sheets were fixed by spraying a bonding agent in liquid form as shown in FIG. 1. The bonding agent used was a water soluble polyvinyl alcohol (PVA). The quantity of PVA used was 2.1% by weight relative to the weight of the sheets.

A multiaxial sheet was made using a machine of the type shown in FIGS. 6A and 16, by using a 100 cm wide unidirectional sheet as the longitudinal sheet (0°) together with 100 mm wide unidirectional sheets as the transverse sheets which were laid in the following directions: 90°, +45°, and −45°, the sequence being 90°/+45°/0°/−45°. The four sheets were bonded together by stitching using a continuous 76 dtex polyester thread. A 6 gauge was used and a chain stitch type stitch having a pitch of 4 mm was employed.

After the unidirectional sheets had been bonded together, the multiaxial sheet was de-oiled to eliminate the PVA and to make it compatible with the intended utilizations.

Such a multiaxial sheet is suitable, for example, for being impregnated with an epoxy resin to make composite material parts.

Example 7

A +45°/0°/−45° "mirror" multiaxial sheet was made from a longitudinal unidirectional sheet (0°) of high modulus M46JB type carbon fibers from the French company SOFICAR and from two transverse unidirectional sheets (+45°, −45°) of high strength T700SC type carbon fibers from the Japanese company TORAY.

The 0° sheet was formed by spreading 12 K-filament tows to a width of 3 mm and by juxtaposing the spread tows to obtain a 300 mm wide sheet weighing 150 g/m².

The +45° and −45° sheets were formed by spreading 12 K-filament tows to a width of 8 mm and by juxtaposing the spread cables so as to obtain 130 mm wide sheets weighing 100 g/m².

The unidirectional sheets were fixed by immersion in a bath containing an epoxy resin emulsion. The sheets were passed between presser rolls to wring out the resin so that its final concentration was 1.8% by weight relative to the weight of the sheet.

Laying was performed in the +45°/0°/−45° sequence, with the transverse sheet segments being juxtaposed edge to edge.

Bonding between the unidirectional sheets was provided by placing a heat-fusible copolyamide thread between the sheet every 100 mm, and by causing the multiaxial sheet to pass between two heater rolls, as shown in FIG. 17.

After being impregnated with an epoxy resin that is chemically compatible with the bonding agent used for imparting cohesion to the unidirectional sheets, the resulting multiaxial sheet was used to make carbon/epoxy composite masts for boats.

Example 8

A 90°/+30°/−30° three-axis sheet was made from three identical unidirectional sheets. Each unidirectional sheet was made by spreading 50 K-filament tows of high-strength carbon fibers to a width of 18 mm and by juxtaposing the spread tows to obtain a 200 mm wide sheet weighing 200 g/m². The unidirectional sheet was fixed by spraying an emulsion of vinylpyrrolydone polymer at a concentration corresponding to 0.8% dry weight.

The unidirectional sheets were superposed in segments that were juxtaposed edge to edge and bonded together by stitching using a 76 dtex polyester thread using a chain stitch type sewing stitch. A 6 gauge was used with a sewing pitch of 4 mm.

The resulting multiaxial sheet could then be de-oiled to eliminate the bonding agent used to impart cohesion to the unidirectional sheets.

Example 9

A 0°/+45°/90°/−45° multiaxial sheet was made from four identical unidirectional sheets. Each unidirectional sheet was formed by spreading glass fiber threads of the "Roving 2400 tex" type. The spread threads were juxtaposed longitudinally and held parallel to one another by a heat-fusible thread placed transversely about every 5 cm, such that the cohesive unidirectional sheet formed in this way weighed 300 g/m² and a width of 20 cm.

Using these unidirectional sheets, the multiaxial 0°/+45°/90°/−45° sheet was formed with the +45°, 90°, and −45° sheets being constituted by segments juxtaposed edge to edge. The four unidirectional sheets were bonded together by lines of stitching using a polyester thread. The stitch had a length of about 10 mm and the lines of stitching were spaced apart by about 40 mm.

A cohesive glass fiber multiaxial sheet was obtained having stitching at very low density, such that the multiaxial sheet retained sufficient flexibility to be easily pre-formed, and it presented a smooth surface state.

Example 10

A four-axis sheet was made from four identical unidirectional sheets. Each unidirectional sheet was formed by spreading 12 K-filament carbon threads supplied by the Japanese company "Toray" under the reference "T700SC". The spread threads were juxtaposed and held together by a heat-fusible thread placed transversely about every 5 cm, such that the resulting cohesive unidirectional sheet weighed 150 g/m² and a width of 10 cm.

From those unidirectional sheets, two multiaxial sheets of types A and B were formed as follows:

A: −45°/0°/+45/90°

B: +45°/0°/−45°/90°.

The unidirectional sheets forming those two multiaxial sheets were held together by stitching with a polyester thread. Low density stitching was performed with a stitch that was 10 mm long and with lines of stitching that were spaced apart by 25 mm.

Multiaxial A and B sheets can be superposed so as to build up a "mirror" stack having the same number of sheets disposed on either side of a middle longitudinal plane of symmetry, with each A sheet or B sheet being symmetrical to a B sheet or an A sheet about said plane.

For example, one "mirror" stack had the following succession of sheets: A/A/A/B/B/B. That stack was made cohesive by stitching in its thickness with an aramid thread, e.g. a 217 dtex "Kevlar" (registered trademark) thread with stitching being performed at a pitch of 5 mm×5 mm.

What is claimed is:

1. A method of making a multi-axial fiber sheet comprising the steps of superposing a plurality of unidirectional sheets in different directions and of bonding the superposed sheets together, wherein at least one said unidirectional sheets is made by spreading at least one tow so as to obtain a sheet of substantially uniform thickness, having a width of not less than 5 cm and a weight of not more than 300 g/m², and by imparting a transverse cohesion to the unidirectional sheet enabling it to be handled prior to be superposed with at least one other unidirectional sheet.

2. A method according to claim 1, characterized in that to make at least one of the unidirectional sheets, a plurality of tows are used, the tows are spread so as to form unidirectional strips, and the strips are placed side by side so as to obtain a unidirectional sheet having a width of not less than 5 cm and weighing not more than 300 g/m².

3. A method according to claim 1, characterized in that the fibers of the unidirectional sheets are of a material selected from carbon, ceramics, carbon or ceramic precursors, glasses, and aramids.

4. A method according to claim 3, characterized in that at least one of the unidirectional sheets is obtained by spreading at least one tow in which the number of filaments is not less than 12 K.

5. A method according to claim 1, characterized in that unidirectional sheets made of fibers of different kinds are superposed.

6. A method according to claim 1, characterized in that at least one unidirectional sheet is made of a plurality of different kinds of fiber.

7. A method according to claim 1, characterized in that at least one of the unidirectional sheets is made by spreading at least one tow made up continuous filaments.

8. A method according to claim 1, characterized in that at least one of the unidirectional sheets is made by spreading at least one burst tow made of discontinuous filaments.

9. A method according to claim 8, characterized in that at least one unidirectional sheet is made by spreading at least one hybrid tow constituted by intimately mixed discontinuous filaments of a plurality of different materials.

10. A method according to claim 8, characterized in that transverse cohesion is imparted to the unidirectional sheet by lightly matting discontinuous filaments.

11. A method according to claim 10, characterized in that the matting is performed by subjecting the sheet as it passes over a plate to a jet of water under pressure.

12. A method according to claim 1, characterized in that transverse cohesion is imparted to at least one of the unidirectional sheets by needling.

13. A method according to claim 10, characterized in that, after transverse cohesion has been imparted to the unidirectional sheet, the sheet is widened.

14. A method according to claim 1, characterized in that transverse cohesion is imparted to at least one of the unidirectional sheets by applying a chemical bonding agent.

15. A method according to claim 14, characterized in that a bonding agent is used that can be eliminated.

16. A method according to claim 15, characterized in that a water soluble bonding agent is used.

17. A method according to claim 14, characterized in that the bonding agent is applied by depositing on the unidirectional sheet a liquid compound containing the bonding agent or a precursor therefor.

18. A method according to claim 17, characterized in that the bonding agent is applied by depositing, on the unidirectional sheet, a liquid compound containing a polymer in solution.

19. A method according to claim 17, characterized in that the bonding agent is applied by depositing, on the unidirectional sheet, a liquid compound containing a resin, and by polymerizing the resin.

20. A method according to any claim 17, characterized in that the bonding agent is deposited by spraying the liquid compound onto the unidirectional sheet.

21. A method according to claim 17, characterized in that the bonding agent is deposited by soaking the unidirectional sheet in a bath containing the liquid compound.

22. A method according to claim 1, characterized in that transverse cohesion is imparted to at least one of the sheets by fixing at least one heat-fusible thread.

23. A method according to claim 1, characterized in that a continuous multiaxial sheet is made having a longitudinal direction by fetching at least one unidirectional transverse sheet by means of a support that moves in an advance direction parallel to the longitudinal direction of the multiaxial sheet, the or each transverse unidirectional sheet being fetched in successive segments that form the same selected angle relative to the direction of advance.

24. A method according to claim 23, characterized in that a multiaxial sheet is formed by superposing two transverse unidirectional sheets at opposite angles relative to the direction of advance.

25. A method according to claim 23, characterized in that a multiaxial sheet is made by superposing at least two unidirectional sheets, one of the unidirectional sheets being a longitudinal sheet of direction parallel to the direction of advance.

26. A method according to claim 23, characterized in that a multiaxial sheet is made by superposing at least three unidirectional sheets, one of the unidirectional sheets being a longitudinal sheet of direction parallel to the direction of advance, and at least two other unidirectional sheets being transverse sheets of directions at different angles to the direction of the longitudinal sheet.

27. A method according to claim 26, characterized in that the longitudinal sheet is deposited between two transverse sheets of directions that form angles of opposite signs relative to the direction of the longitudinal sheet.

28. A method according to claim 25, characterized in that the longitudinal sheet is made by placing side by side a plurality of unidirectional strips each obtained by spreading a tow, thereby obtaining a longitudinal strip having a width of not less than 10 cm.

29. A method according to claim 28, characterized in that the longitudinal sheet is made by placing side by side a plurality of unidirectional strips each obtained by spreading a tow having a number of filaments that is not less than 12 K.

30. A method according to claim 23, characterized in that the successive segments forming at least one transverse sheet are fetched so as be adjacent.

31. A method according to claim 23, characterized in that the successive segments forming at least one transverse sheet are fetched with partial overlap.

32. A method according to claim 23, characterized in that each of the successive segments forming a transverse sheet is fetched by moving the sheet over a length substantially equal to the dimension of the multiaxial sheet as measured parallel to the direction of the transverse sheet, by cutting off the segment fetched in this way, and by depositing the cutoff segment on the moving support or the multiaxial sheet that is being made.

33. A method according to claim 32, characterized in that the moving support is moved continuously in the direction of advance while successive segments are being fetched to form the or each transverse unidirectional sheet and the multiaxial sheet is being made.

34. A method according to claim 32, characterized in that the transverse sheet is locally reinforced in the zones where it is cut up.

35. A method according to claim 34, characterized in that the transverse sheet is reinforced by fixing a film on at least one of its faces.

36. A method according to claim 35, characterized in that the transverse sheet is reinforced by fixing a thermoadhesive film and by heating under pressure.

37. A method according to claim 32, characterized in that the unidirectional sheets are held relative to one another at least until the superposed unidirectional sheets have been bonded together.

38. A method according to claim 37, characterized in that the unidirectional sheets are held by being fixed on spikes.

39. A method according to claim 37, characterized in that the unidirectional sheets are held by fixing at least one film along each longitudinal edge of the multiaxial sheet that is being made.

40. A method according to claim 35, characterized in that a reinforcing film is used to hold the unidirectional sheet segments in the positions into which they are fetched.

41. A method according to claim 1, characterized in that the superposed unidirectional sheets ire bonded together by needling.

42. A method according to claim 1, characterized in that the superposed unidirectional sheets are bonded together by sewing or knitting.

43. A method according to claim 1, characterized in that the superposed sheets are bonded together by adhesive.

44. A method according to claim 43, characterized in that the superposed sheets are bonded together by inserting a heat-fusible thread between the sheets.

45. A method according to claim 2, characterized in that:
the fibers of the unidirectional sheets are of a material selected from carbon, ceramics, carbon or ceramic precursors, glasses, and aramids;
at least one of the unidirectional sheets is obtained by spreading at least one tow in which the number of filaments is not less than 12 K;
unidirectional sheets made of fibers of different kinds are superposed;
at least one unidirectional sheet is made of a plurality of different kinds of fiber;
at least one of the unidirectional sheets is made by spreading at least one tow made up continuous filaments;
at least one of the unidirectional sheets is made by spreading at least one burst tow made of discontinuous filaments;
at least one unidirectional sheet is made by spreading at least one hybrid tow constituted by intimately mixed discontinuous filaments of a plurality of different materials;
that transverse cohesion is imparted to the unidirectional sheet by lightly matting discontinuous filaments;
the matting is performed by subjecting the sheet as it passes over a plate to a jet of water under pressure; after transverse cohesion has been imparted to the unidirectional sheet, the sheet is widened.

46. A method according to claim 9, characterized in that transverse cohesion is imparted to at least one of the unidirectional sheets by needling.

47. A method according to claim 9, characterized in that:
transverse cohesion is imparted to at least one of the unidirectional sheets by applying a chemical bonding agent;
a bonding agent is used that can be eliminated;
a water soluble bonding agent is used;
the bonding agent is applied by depositing on the unidirectional sheet a liquid compound containing the bonding agent or a precursor therefor;

the bonding agent is applied by depositing, on the unidirectional sheet, one of a liquid compound containing a polymer in solution; a liquid compound containing a resin, and by polymerizing the resin;

the bonding is deposited by spraying the liquid compound onto the unidirectional sheet or by soaking the unidirectional sheet in a bath containing the liquid compound.

48. A method to claim 9, characterized in that:

transverse cohesion is imparted to at least one of the sheets by fixing at least one heat-fusible thread;

a continuous multiaxial sheet is made having a longitudinal direction by fetching at least one unidirectional transverse sheet by means of a support that moves in an advance direction parallel to the longitudinal direction of the multiaxial sheet, the or each transverse unidirectional sheet being fetched in successive segments that form the same selected angle relative to the direction of advance;

a multiaxial sheet is formed by one of superposing two transverse unidirectional sheets at opposite angles relative to the direction of advance or superposing at least two unidirectional sheets, one of the unidirectional sheets being longitudinal sheet of direction parallel to the direction of advance and superposing at least three unidirectional sheets, one of the unidirectional sheets being a longitudinal sheet of direction parallel to the direction of advance, and at least two other unidirectional sheets being transverse sheets of directions at different angles to the direction of the longitudinal sheet;

the longitudinal sheet being deposited between two transverse sheets of directions that form angles of opposite signs relative to the direction of the longitudinal sheet;

the longitudinal sheet is made by placing side by side a plurality of unidirectional strips each obtained by spreading a tow, thereby obtaining a longitudinal strip having a width of not less than 10 cm;

the longitudinal sheet is made by placing side by side a plurality of unidirectional strips each obtained by spreading a tow having a number of filaments that is not less than 12 K;

the successive segments forming at least one transverse sheet are fetched so as be adjacent or with partial overlap;

each of the successive segments forming a transverse sheet is fetched by moving the sheet over a length substantially equal to the dimension of the multiaxial sheet as measured parallel to the direction of the transverse sheet, by cutting off the segment fetched in this way, and by depositing the cutoff segment on the moving support or the multiaxial sheet that is being made;

the moving support is moved continuously in the direction of advance while successive segments are being fetched to form the or each transverse unidirectional sheet and the multiaxial sheet is being made;

the transverse sheet is locally reinforced in the zones where it is cut up;

the transverse sheet is reinforced by fixing a film on at least one of its faces;

the transverse sheet is reinforced by fixing a thermoadhesive film and by heating under pressure;

the unidirectional sheets are held relative to one another at least until the superposed unidirectional sheets have been bonded together;

the unidirectional sheets are held by being fixed on spikes or by fixing at least one film along each longitudinal edge of the multiaxial sheet that is being made.

\* \* \* \* \*